United States Patent
Kim et al.

(10) Patent No.: US 11,382,049 B2
(45) Date of Patent: Jul. 5, 2022

(54) METHOD AND APPARATUS FOR TRANSMITTING AND RECEIVING DATA IN WIRELESS COMMUNICATION SYSTEM

(71) Applicant: Samsung Electronics Co., Ltd., Suwon-si (KR)

(72) Inventors: Sang-Bum Kim, Suwon-si (KR); Jae-Hyuk Jang, Suwon-si (KR); Soeng-Hun Kim, Suwon-si (KR); Seung-Ri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/583,028

(22) Filed: Sep. 25, 2019

(65) Prior Publication Data

US 2020/0022095 A1 Jan. 16, 2020

Related U.S. Application Data

(63) Continuation of application No. PCT/KR2018/011134, filed on Sep. 20, 2018.

(30) Foreign Application Priority Data

Sep. 20, 2017 (KR) .................. 10-2017-0121425

(51) Int. Cl.
*H04W 24/08* (2009.01)
*H04W 52/36* (2009.01)
(Continued)

(52) U.S. Cl.
CPC ........... *H04W 52/365* (2013.01); *H04W 8/08* (2013.01); *H04W 72/10* (2013.01); *H04W 76/15* (2018.02)

(58) Field of Classification Search
CPC .............................. H04W 52/365; H04W 8/08
See application file for complete search history.

(56) References Cited

U.S. PATENT DOCUMENTS 9,603,098 B2 * 3/2017 Ryoo .................... H04W 76/15
9,706,593 B2 * 7/2017 Park ..................... H04W 36/18
(Continued)

FOREIGN PATENT DOCUMENTS

| CN | 104349441 A | 2/2015 |
| CN | 105307259 A | 2/2016 |

(Continued)

OTHER PUBLICATIONS

Supplementary European Search Report dated Apr. 3, 2020 in connection with European Patent Application No. 18 85 9465, 11 pages.

(Continued)

*Primary Examiner* — Parth Patel

(57) ABSTRACT

Various embodiments of the present disclosure relate to a method for transmitting and receiving data in a wireless communication system. A method by which a terminal transmits a power headroom report (PHR) in a wireless communication system, according to one embodiment of the present disclosure, can comprise the steps of: receiving signaling information including at least one indicator indicating PHR reporting for at least one cell among cells for a dual connectivity operation; and transmitting at least one PHR for the at least one cell corresponding to the at least one indicator. The at least one cell can be a primary cell (Pcell) serving the terminal and/or a primary secondary cell (PScell) serving the terminal.

20 Claims, 23 Drawing Sheets

(51) Int. Cl.
    *H04W 76/15*     (2018.01)
    *H04W 8/08*      (2009.01)
    *H04W 72/10*     (2009.01)

(56) References Cited

U.S. PATENT DOCUMENTS

| | | | | |
|---|---|---|---|---|
| 9,826,489 | B2* | 11/2017 | Park | H04W 52/365 |
| 2012/0218904 | A1* | 8/2012 | Narasimha | H04W 52/38 370/248 |
| 2012/0314640 | A1* | 12/2012 | Kim | H04W 52/367 370/311 |
| 2013/0028231 | A1* | 1/2013 | Zhang | H04W 52/365 370/329 |
| 2013/0182658 | A1* | 7/2013 | Xu | H04W 52/365 370/329 |
| 2014/0129672 | A1* | 5/2014 | Singh | H04W 52/0216 709/217 |
| 2015/0085760 | A1* | 3/2015 | Yamada | H04W 52/365 370/329 |
| 2015/0181479 | A1* | 6/2015 | Lin | H04W 24/04 370/331 |
| 2015/0195796 | A1* | 7/2015 | Sivanesan | H04W 52/365 370/329 |
| 2015/0215877 | A1* | 7/2015 | Ahn | H04W 72/0413 455/522 |
| 2015/0264655 | A1* | 9/2015 | Lee | H04W 52/365 370/329 |
| 2015/0271811 | A1* | 9/2015 | Kim | H04W 52/365 370/329 |
| 2015/0304966 | A1* | 10/2015 | Park | H04L 1/1887 370/252 |
| 2016/0029235 | A1* | 1/2016 | Kim | H04W 24/08 370/252 |
| 2016/0029361 | A1* | 1/2016 | Lu | H04W 72/0406 370/329 |
| 2016/0066284 | A1* | 3/2016 | Kwon | H04W 72/0413 370/329 |
| 2016/0088624 | A1* | 3/2016 | Lee | H04W 52/365 370/329 |
| 2016/0128046 | A1* | 5/2016 | Sebire | H04L 5/001 370/329 |
| 2016/0142984 | A1* | 5/2016 | Lee | H04W 72/0413 370/329 |
| 2016/0150485 | A1* | 5/2016 | Yi | H04W 52/34 370/311 |
| 2016/0174160 | A1 | 6/2016 | Shen et al. | |
| 2016/0205681 | A1* | 7/2016 | Kim | H04L 5/001 370/329 |
| 2016/0212711 | A1* | 7/2016 | Yi | H04W 52/281 |
| 2016/0242052 | A1* | 8/2016 | Kazmi | H04W 84/18 |
| 2016/0270094 | A1 | 9/2016 | Dinan | |
| 2016/0270110 | A1 | 9/2016 | Dinan | |
| 2016/0309423 | A1 | 10/2016 | Lee et al. | |
| 2016/0309424 | A1* | 10/2016 | Dinan | H04W 52/58 |
| 2016/0337989 | A1* | 11/2016 | Chen | H04W 52/365 |
| 2017/0013498 | A1* | 1/2017 | Yi | H04B 1/707 |
| 2017/0019864 | A1* | 1/2017 | Hwang | H04W 52/325 |
| 2017/0034793 | A1* | 2/2017 | Uchino | H04W 52/365 |
| 2017/0078984 | A1 | 3/2017 | Uemura et al. | |
| 2017/0118658 | A1* | 4/2017 | Hwang | H04W 16/32 |
| 2017/0142707 | A1* | 5/2017 | Zhang | H04W 52/04 |
| 2017/0150458 | A1* | 5/2017 | Yang | H04W 52/365 |
| 2017/0215156 | A1* | 7/2017 | Chen | H04W 52/40 |
| 2017/0223642 | A1* | 8/2017 | Lee | H04W 52/365 |
| 2017/0223763 | A1* | 8/2017 | Rahman | H04W 76/15 |
| 2017/0273037 | A1* | 9/2017 | Uchino | H04W 72/04 |
| 2017/0347326 | A1* | 11/2017 | Dinan | H04W 52/242 |
| 2018/0007693 | A1* | 1/2018 | Lee | H04L 5/0053 |
| 2018/0035470 | A1* | 2/2018 | Chen | H04W 48/16 |
| 2018/0054814 | A1* | 2/2018 | Zhang | H04W 76/27 |
| 2018/0063798 | A1 | 3/2018 | Yi et al. | |
| 2018/0083743 | A1* | 3/2018 | Chen | H04L 1/1854 |
| 2018/0234927 | A1* | 8/2018 | Aiba | H04W 72/0413 |
| 2018/0262999 | A1* | 9/2018 | Yi | H04W 72/0413 |
| 2018/0279262 | A1* | 9/2018 | Babaei | H04W 72/04 |
| 2018/0368107 | A1* | 12/2018 | Babaei | H04L 27/2608 |
| 2019/0053170 | A1* | 2/2019 | Lee | H04W 76/27 |
| 2019/0132896 | A1* | 5/2019 | Kusashima | H04W 72/04 |
| 2019/0166561 | A1* | 5/2019 | Yi | H05K 999/99 |
| 2019/0253908 | A1* | 8/2019 | Fan | H04W 24/10 |
| 2020/0008162 | A1* | 1/2020 | Dinan | H04W 52/325 |
| 2020/0022094 | A1* | 1/2020 | You | H04W 72/0413 |
| 2020/0022095 | A1* | 1/2020 | Kim | H04W 76/15 |
| 2020/0029378 | A1* | 1/2020 | Xiao | H04W 76/15 |
| 2020/0059290 | A1* | 2/2020 | Pan | H04B 7/0695 |
| 2020/0107392 | A1* | 4/2020 | Yi | H04W 76/38 |
| 2020/0169966 | A1* | 5/2020 | Chang | H04W 52/36 |
| 2020/0196374 | A1* | 6/2020 | Lim | H04W 76/27 |
| 2020/0305213 | A1* | 9/2020 | Teyeb | H04W 76/15 |

FOREIGN PATENT DOCUMENTS

| | | | |
|---|---|---|---|
| CN | 105519210 | A | 4/2016 |
| CN | 105580451 | A | 5/2016 |
| CN | 105592539 | A * | 5/2016 |
| CN | 105794283 | A | 7/2016 |
| CN | 106105301 | A | 11/2016 |
| CN | 107534942 | A | 1/2018 |
| CN | 107925971 | A | 4/2018 |
| EP | 3172923 | A1 | 5/2017 |
| WO | 2015093768 | A1 | 6/2015 |
| WO | 2016/013814 | A1 | 1/2016 |
| WO | 2016144879 | A1 | 9/2016 |
| WO | 2017022617 | A1 | 2/2017 |

OTHER PUBLICATIONS

Ericsson, "PHR Text proposal", 3GPP TSG-RAN WG2 #99, Aug. 21-25, 2017, Tdoc R2-1708200, 3 pages.

Lenovo, Motorola Mobility, "PHR for NR CA", 3GPP TSG-RAN WG2 Meeting #99, Aug. 21-25, 2017, R2-1708645, 3 pages.

Huawei, HiSilicon, "Consideration on PHR for EN-DC", 3GPP TSG-RAN WG2 Meeting #99, Aug. 21-25, 2017, R2-1708957, 3 pages.

Samsung, "NSA PHR for EN-DC", 3GPP TSG-RAN WG2 #99, Aug. 21-25, 2017, R2-1709572, 3 pages.

International Search Report dated Dec. 27, 2018 in connection with International Patent Application No. PCT/2018/011134, 3 pages.

Written Opinion of the International Searching Authority dated Dec. 27, 2018 in connection with International Patent Application No. PCT/KR2018/011134, 6 pages.

China National Intellectual Property Administration (CNIPA), "Notification of the Decision to Grant" dated Jan. 13, 2022, in connection with Chinese Patent Application No. 201880073146.5, 11 pages.

Samsung, "Power headroom report for dual connectivity" 3GPP TSG RAN WG2 #85, R2-140328, Feb. 10-14, 2014, Prague, Czech Republic, 4 pages.

Alcatel-Lucent Shanghai Bell et al., "PHR enhancement to support DC" 3GPP TSG-RAN2 Meeting #85bis, R2-141510, Valencia, Spain, Mar. 31-Apr. 4, 2014, 5 pages.

NTT Docomo Inc., "Condition to include Type2 PH" 3GPP TSG-RAN WG2 #91 bis, R2-154408, Malmo, Sweden, Oct. 5-9, 2015, 7 pages.

Huawei et al., "Remaining issues of PHR for dual connectivity" 3GPP TSG-RAN WG2 Meeting #87, R2-143345, Dresden, Germany, Aug. 18-22, 2014, 3 pages.

* cited by examiner

METHOD AND APPARATUS FOR TRANSMITTING AND RECEIVING DATA IN WIRELESS COMMUNICATION SYSTEM

CROSS-REFERENCE TO RELATED APPLICATIONS

This application is a continuation of International Application No. PCT/KR2018/011134 filed on Sep. 20, 2018, which claims priority to Korean Patent Application No. 10-2017-0121425 filed on Sep. 20, 2017, the disclosures of which are herein incorporated by reference in their entirety.

BACKGROUND

1. Field

The present disclosure relates to a method for transmitting and receiving data in a wireless communication system, and more particularly to a method and apparatus for performing cell reselection by considering a slice in a wireless communication system.

2. Description of Related Art

The present disclosure relates to a method and apparatus for solving an overheating problem of a user equipment in a wireless communication system.

The present disclosure relates to a method and apparatus for activating and deactivating cells in a wireless communication system.

The present disclosure relates to a method and apparatus for indicating a power headroom report in a wireless communication system.

To meet the demand for wireless data traffic, which has increased since deployment of 4th-Generation (4G) communication systems, efforts have been made to develop an improved 5th-Generation (5G) or pre-5G communication system. Therefore, the 5G or pre-5G communication system is also called a 'Beyond 4G Network' or a 'Post LTE system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a Full Dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a Device to Device communication (D2D), a wireless backhaul, a moving network, a cooperative communication, Coordinated Multi-Points (CoMP), reception-end interference cancellation, and the like.

In the 5G system, a hybrid FSK and QAM modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

5G network technology is trying to follow up to the 4G LTE mobile communication technology by aiming for an end-to-end (E2E) system in which all objects (e.g., a piece of technology, a domain, a layer, a piece of equipment/device, user interaction, and/or the like) of a network which is accessed with various wireless methods as well as a wired method are connected. For this, standardization groups such as ITU-R, ITU-T, NGMN, 3GPP, and/or the like have been designing systems and network structures on completely new, clean slates in order to implement wireless and wired network technology with characteristics such as high performance, low latency, high availability, and/or the like.

The Internet, which is a human centered connectivity network where humans generate and consume information, is now evolving into the Internet of Things (IoT) where distributed entities, such as electronic devices, household appliances, etc., exchange and process information without human intervention. The Internet of Everything (IoE), which is a combination of the IoT technology and big data processing technology through connection with a cloud server, has emerged.

As technology elements, such as "sensing technology", "wired/wireless communication and network infrastructure", "service interface technology", and "security technology" have been demanded for IoT implementation, a sensor network, Machine to Machine (M2M) communication, Machine Type Communication (MTC), and so forth are being researched.

Such an IoT environment may provide intelligent Internet Technology (IT) services that create new value for human life by collecting and analyzing data generated among connected things. IoT may be applied to a variety of fields including smart homes, smart buildings, smart cities, smart cars or connected cars, smart grids, health care, smart appliances and advanced medical services through convergence and combination between existing IT and various industrial applications.

Accordingly, various attempts have been made to apply a 5G communication system to an IoT network. For example, a technology such as a sensor network, machine to machine communication, MTC, and/or the like has been implemented with a 5G communication technology such as beamforming, MIMO, an array antenna, and/or the like. A case that a cloud radio access network as described above is applied as big data processing technology may be an example of convergence of a 5G technology and an IoT technology.

The above information is presented as background information only to assist with an understanding of the present disclosure. No determination has been made, and no assertion is made, as to whether any of the above might be applicable as prior art with regard to the present disclosure.

SUMMARY

The present disclosure relates to a method and apparatus for providing priority information such that a user equipment may reselect a cell by considering a slice at which the user equipment is registered or which the user equipment supports upon reselecting the cell.

The present disclosure relates to a method and apparatus for processing capability information of a user equipment in order to mitigate a problem that a communication modem chipset is overheated due to configuration related to high-performance transmission.

The present disclosure relates to a method and apparatus for activating and deactivating each cell in a case of aggregating and using cells with a plurality of transmission time units.

The present disclosure relates to a method and apparatus for reporting a plurality of types of power headroom in a case of using a plurality of types of uplink transmission technologies.

According to an embodiment of the present disclosure, a method for selecting a cell by a base station may include receiving information about a first slice which is supportable for each of a plurality of frequencies, receiving information about a slice at which a user equipment is registered or information about a second slice which the user equipment supports, generating frequency priority information based on the information about the first slice and the information about the second slice, and transmitting the priority information to the user equipment.

According to another embodiment of the present disclosure, a method for applying configuration of a user equipment may include receiving, from a user equipment, configuration information for solving an overheating problem, generating reconfiguration information based on a message including the configuration information, and transmitting the reconfiguration information to the user equipment.

According to still another embodiment of the present disclosure, a method for activating an operation in a user equipment may include receiving, from a base station, a message including configuration for adding a secondary cell (SCell), adding the secondary cell, receiving a message for activating the secondary cell, determining a time point at which an operation for the secondary cell is performed based on a slot length of a primary cell (PCell) and a slot length of the secondary cell, and performing the operation at the time point.

Meanwhile, a method for transmitting power headroom by a user equipment may include receiving, from a base station, a parameter used for transmitting power headroom, determining whether a power headroom triggering criterion is satisfied based on the parameter, generating the power headroom based on the parameter if the criterion is satisfied, and transmitting, to the base station, the power headroom.

Embodiments of the present disclosure may provide cell-reselection priority information such that a user equipment may reselect a cell by considering a slice at which the user equipment is registered or which the user equipment supports.

Embodiments of the present disclosure may mitigate a problem that a communication modem chipset of a user equipment is overheated due to configuration related to high-performance transmission.

Embodiments of the present disclosure may activate and deactivate each cell in a case of aggregating and using cells with a plurality of transmission time units.

Embodiments of the present disclosure may report a plurality of types of power headroom in a case of using a plurality of types of uplink transmission technologies.

Effects of various embodiments of the present disclosure are not limited to effects as described above, and tentative effects which are expected according to a technical characteristic of the present disclosure will be clearly understood from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
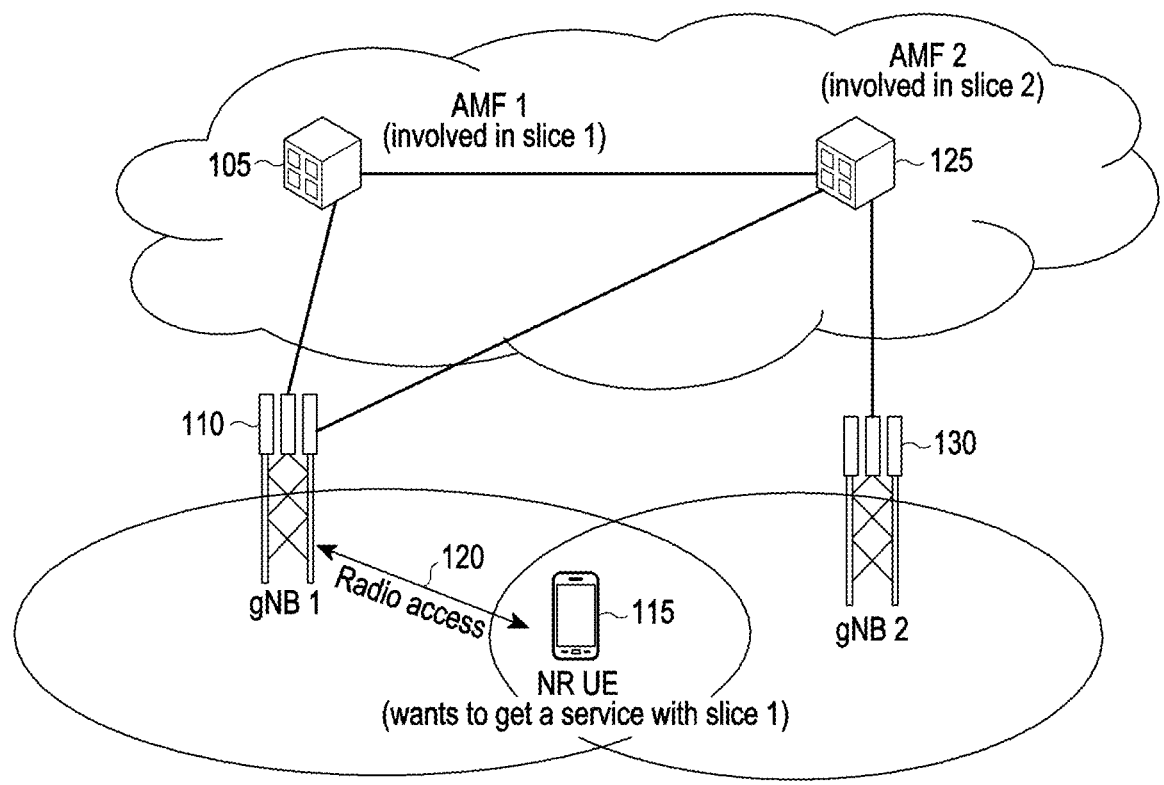
FIG. 1 is a diagram illustrating a structure of a wireless communication system according to an embodiment of the present disclosure.

FIGS. 1 through 29, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

A base station is a subject which communicates with a user equipment, and may be referred to as a BS, a NodeB (NB), an eNodeB (eNB), a gNodeB (gNB), an Access Point (AP), and/or the like.

A user equipment is a subject which communicates with a base station, and may be referred to as a UE, a Mobile Station (MS), a Mobile Equipment (ME), a device, a terminal, and/or the like.

The term for identifying an access node, the term referring to network entities, the term referring to messages, the term referring to an interface between the network entities, the term referring to various identification information, and/or the like used in the following description are examples for convenience of description. So, the present disclosure is not limited to the terms to be described below, and a different term referring to an object which has the same technical meaning may be used.

For convenience of description, the present disclosure uses terms and terminologies which are defined in the 3rd Generation Partnership Project Long Term Evolution (3GPP LTE) standard as the latest one among current communication standards. However, the present disclosure is not limited to the terms and terminologies, and may be applied to a system which follows other standard in the same way. The present disclosure may be applied to a 3GPP New Radio (NR) (as a standard for the 5th generation-mobile communication).

Hereinafter, various embodiments of the present disclosure will be described with drawings.

FIG. 1 is a diagram illustrating a structure of a wireless communication system according to an embodiment of the present disclosure. Referring to FIG. 1, a wireless communication system 10 includes the first base station gNB1 110, the second base station gNB2 130, the first AMF AMF1 105 and the second AMF AMF2 125 in a core network, and a user equipment New Radio User Equipment 115 (hereinafter, "NR UE" or user equipment). At this time, the gNB1 110 and the gNB2 130 may be a base station of the 5th generation-mobile communication standard, and may be connected to at least one of the first AMF 105 or the second AMF 125 in the core network. The user equipment 115 may access an external network through the wireless communication system 10.

The gNB1 110 and the gNB2 130 may be components which correspond to an Evolved Node B (eNB) of an existing LTE system. The gNB1 110 and the gNB2 130 are connected to the NR UE 115 with a radio channel, and may provide an outstanding service compared to an existing eNB. Specially, all user traffic is serviced through a shared channel in the 5th generation-wireless communication system, so there is a need for an apparatus which collects buffer status, available transmission power status, channel status, and/or the like of UEs to perform scheduling, and a gNB is responsible for this. One gNB may generally control a plurality of cells. For implementing high speed-data transmission compared to an existing LTE, the gNB may have a band width which is larger than or equal to an existing maximum band width, and a beamforming technology may be added with an Orthogonal Frequency Division Multiplexing (OFDM) scheme as a radio access technology. Further, the gNB applies an Adaptive Modulation & Coding (AMC) scheme in which a modulation scheme and a channel coding rate are determined according to channel status of a user equipment.

The AMF1 105 and the AMF2 125 are components for performing a function to support mobility, a function to establish a bearer, a function to configure QoS, and/or the like. The AMF1 105 and the AMF2 125 are apparatuses responsible for various control functions as well as a function to manage mobility of a user equipment, and may be connected to a plurality of base stations. The AMF1 105 and the AMF2 125 may provide a service optimized for a specific slice.

At this time, a slice refers to a concept for providing a service optimized for a specific service or a specific user equipment group. For example, requirements of the 5th mobile communication are classified into super-high speed data transmission (e.g., an enhanced Mobile BroadBand (eMBB)), a massive Machine Type Communication (mMTC), and Ultra Reliable and Low Latency Communications (URLLC). At this time, there may be a slice which corresponds to each requirement. For example, if the user equipment 115 intends to receive a service through the first slice which corresponds to a specific service, the user equipment 115 may request to be connected to a suitable specific AMF1 105 through the gNB1 110. Alternatively, the gNB1 110 may select the AMF1 105 by considering a service which the user equipment 115 requests.

Figure 2:
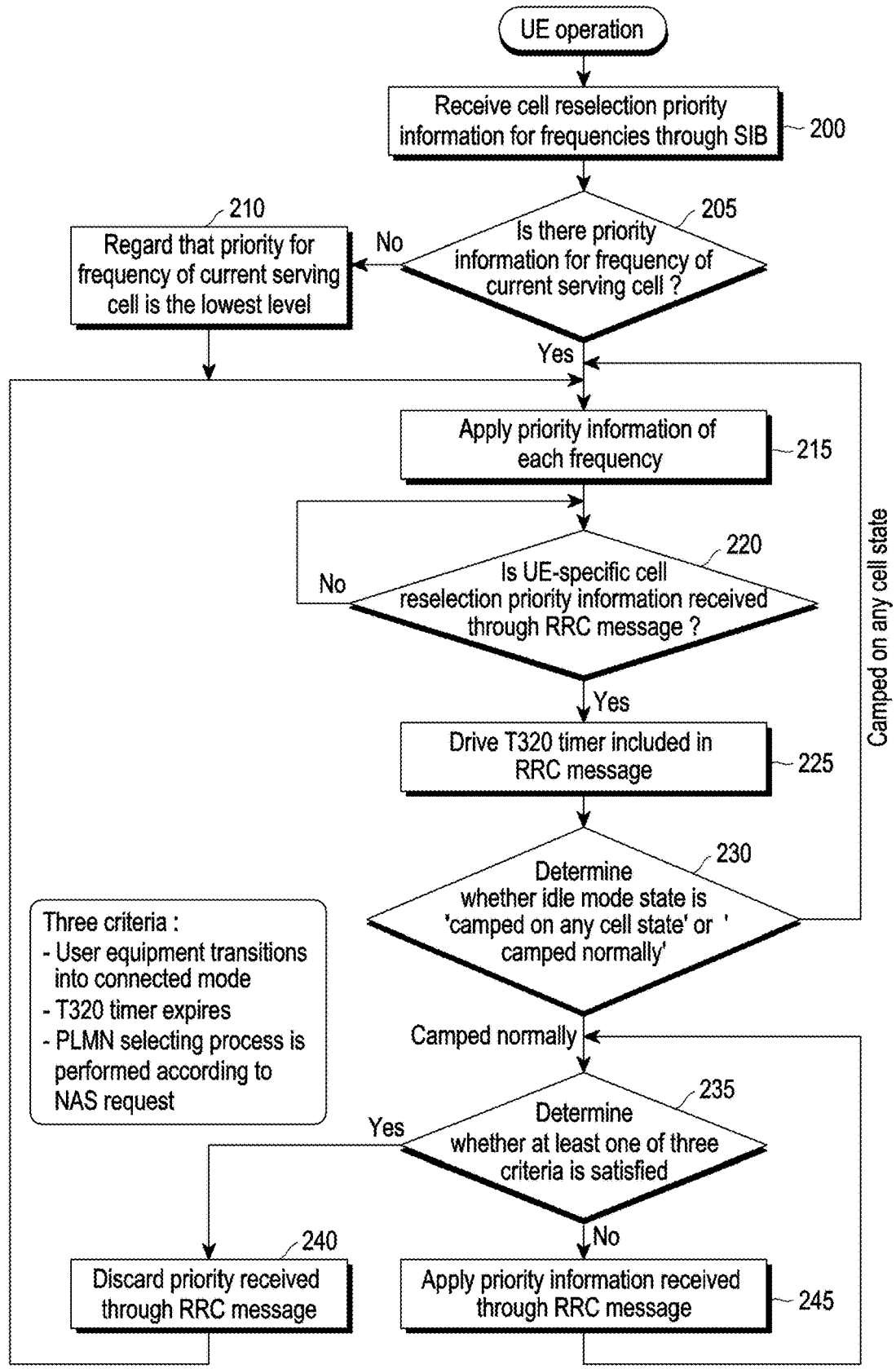
FIG. 2 is a diagram for describing a process in which priority information per frequency for cell reselection is applied to a user equipment in a wireless communication system according to an embodiment of the present disclosure.

FIG. 2 is a diagram for describing a process in which priority information per frequency for cell reselection is applied to a user equipment in a wireless communication system according to an embodiment of the present disclosure.

More specially, FIG. 2 is a diagram for describing a process in which priority information per frequency for cell reselection is broadcasted through an SIB or applied to a user equipment through an RRC Connection Release message as dedicated RRC signaling in a wireless communication system according to an embodiment of the present disclosure. At this time, cell reselection means a process for reselecting a serving cell such that user equipment in motion may be connected to a cell with the best channel status.

A network may allocate a priority to each frequency to control cell reselection of user equipment in an idle mode. For example, if a user equipment receives priority information for two frequencies f1 and f2, and f1 has a higher priority than f2, a probability that the user equipment is in f1 becomes high. Even though the user equipment is in f2, the user equipment may try to change to f1 if the channel status of f2 is not good. Priority information for a frequency may be provided to the user equipment through a broadcasted SIB or an RRC Connection Release message as dedicated RRC signaling. Even though the user equipment has priority information for frequencies through an SIB, the priority information through the SIB may be ignored when the user equipment receives UE-specific priority information through RRC signaling. For example, priority information for each frequency is transferred through a CellReselectionPriority IE in Table 1, and one of total 8-level priorities is allocated to the user equipment. If a value is small, it means that a priority is low. That is, '0' means the lowest priority.

TABLE 1

| CellReselectionPriority information element |
|---|
| -- ASN1START |
| CellReselectionPriority ::=    INTEGER (0..7) |
| -- ASN1STOP |

The same priority may not be allocated to frequencies between RATs. If an idle state of a user equipment is a 'camped on any cell state', the user equipment applies frequency priority information received through an SIB, and stores priority information received through RRC signaling without using the priority information received through the RRC signaling. A CellReselectionPriority IE is an optional IE, so the CellReselectionPriority IE may not exist. In this case, priority information for a corresponding frequency is not allocated. At this time, the user equipment regards that a priority of the corresponding frequency is the lowest level. Referring to FIG. 2, a user equipment receives priority information for frequencies used in other RAT as well as a EUTRA through an SIB in operation 200. However, priority information for all frequencies may not be necessarily provided. Further, priority information for a frequency on which the user equipment camps may not be provided.

The user equipment checks the received priority information in operation 205. If priority information for a frequency of a current serving cell is not provided, the user equipment regards that a priority of the frequency is the lowest level in operation 210.

The user equipment applies priority information of each frequency in operation 215. Upon receiving a RRC Connection Release message from a base station, the user equipment transitions from a connected mode into an idle mode. The RRC message may include priority information of a frequency. The priority information included in the RRC message is UE-specific information, and may be preferentially applied compared to frequency priority information provided through an SIB.

The user equipment may check whether the frequency priority information is included in the received RRC message in operation 220. If there is the priority information, the user equipment applies a T320 value included along with the priority information to drive one timer in operation 225.

The user equipment determines whether a current idle mode state is a 'camped on any cell state' or a 'camped normally state' in operation 230. At this time, the 'camped normally state' refers to a state on which the user equipment camps on a suitable cell. The suitable cell is a cell which may provide a normal service, and satisfies the following detailed criteria.

A cell corresponds to a selected PLMN, a registered PLMN, or one PLMN within an equivalent PLMN list
A cell which is not barred
A cell which satisfies a cell selection criterion
In a case of a closed subscriber group (CSG) cell, a cell of which a CSG ID is within a whitelist of a user equipment.

The 'camped on any cell state' refers to a state on which the user equipment camps on an acceptable cell because the user equipment is unable to camp on the suitable cell. In the acceptable cell, the normal service is impossible, and the user equipment may try an emergency call. The acceptable cell is a cell which satisfies the following criteria.

A cell which is not barred.
A cell which satisfies a cell selection criterion.

If the user equipment is on the 'camped on any cell state' idle state, the user equipment returns to operation 215, and applies the frequency priority information provided through the SIB instead of the priority information provided through the RRC Connection Release message. If the user equipment is on the 'camped normally' idle state, the user equipment determines whether at least one of the following three criteria is in operation 235. The three criteria are as follows.

A user equipment is transitioned into a connected mode
A T320 timer is expired
A PLMN selecting process is performed according to request of an NAS If the at least one of the three criteria is satisfied, the user equipment discards the priority information provided through the RRC Connection Release message in operation 240, and returns to operation 215 to apply the frequency priority information provided through the SIB.

If any one of the three criteria is unsatisfied, the user equipment applies the priority information provided through the RRC Connection Release message in operation 245.

Meanwhile, a user equipment may be affected by frequency priority information upon measuring a specific frequency. More particularly, the user equipment always performs measurement for a frequency of which a priority is higher than a priority of a current serving cell. However, the user equipment does not always perform measurement for a frequency which is the same as the serving cell (intra-frequency) or a frequency of which a priority is lower than or equal to the priority of the serving cell in order to save power. The user equipment performs frequency measurement for the frequency which is the same as the serving cell (intra-frequency) or the frequency of which the priority is lower than or equal to the priority of the serving cell when channel QoS of the serving cell is less than or equal to a specific threshold value. Cell reselection is performed for moving to a cell of which channel status is good, there is no need for moving to the frequency of which the priority is lower than or equal to the priority of the serving cell if the channel QoS of the serving cell is good. So, the user equipment may determine whether to perform the measurement based on the specific threshold value in order to reduce power consumption due to unnecessary channel measurement. In a case of the same frequency (intra-frequency), the user equipment performs channel measurement for other cells of the same frequency if QoS of the serving cell is less than or equal to a specific threshold value $S_{intrasearch}$. For other frequencies of which the priority is lower than or equal to the priority of the serving cell, the user equipment performs channel measurement for other cells of the other frequencies if the QoS of the serving cell is less than or equal to a specific threshold value $S_{nonintrasearch}$. For example, RSRP and RSRQ may be considered as channel QoS.

If channel QoS of a cell of a frequency with a high priority is greater than a specific threshold value $Thresh_{X-high}$ while performing a measurement with a scheme as described above, the user equipment reselects the cell of the frequency with the high priority as a serving cell. If channel QoS of a cell of a frequency with a low priority is greater than a specific threshold value $Thresh_{X-low}$, and QoS of the serving cell is less than $Thresh_{Serving-low}$, the user equipment reselects the cell of the frequency with the low priority as a serving cell.

In the 5th generation-wireless communication system, a slice concept has been introduced, so there is a need for considering a slice upon cell reselection. That is, there is a need for a user equipment to reselect a cell by considering a slice at which the user equipment is registered or which the user equipment supports. This is because a problem may occur that the user equipment sets a connection with a specific cell, and then re-directs to a cell which supports a suitable specific slice if the slice is not considered upon the cell reselection. If the user equipment camps on a cell which supports the slice at which the user equipment is registered or which the user equipment supports in advance, there is no need for the user equipment to perform the re-direction operation. So, a base station according to an embodiment of the present disclosure may provide cell reselection-priority information such that a specific user equipment may reselect a cell by considering a slice at which the user equipment is registered or which the user equipment supports using dedicated RRC signaling upon transitioning from a connected mode to an idle mode. It is necessary for the base station to collect information about all slices at which the user equipment is registered or which the user equipment supports before transmitting the dedicated RRC signaling. In an embodiment of the present disclosure, the base station may receive the information from the user equipment or a core network.

Figure 3:
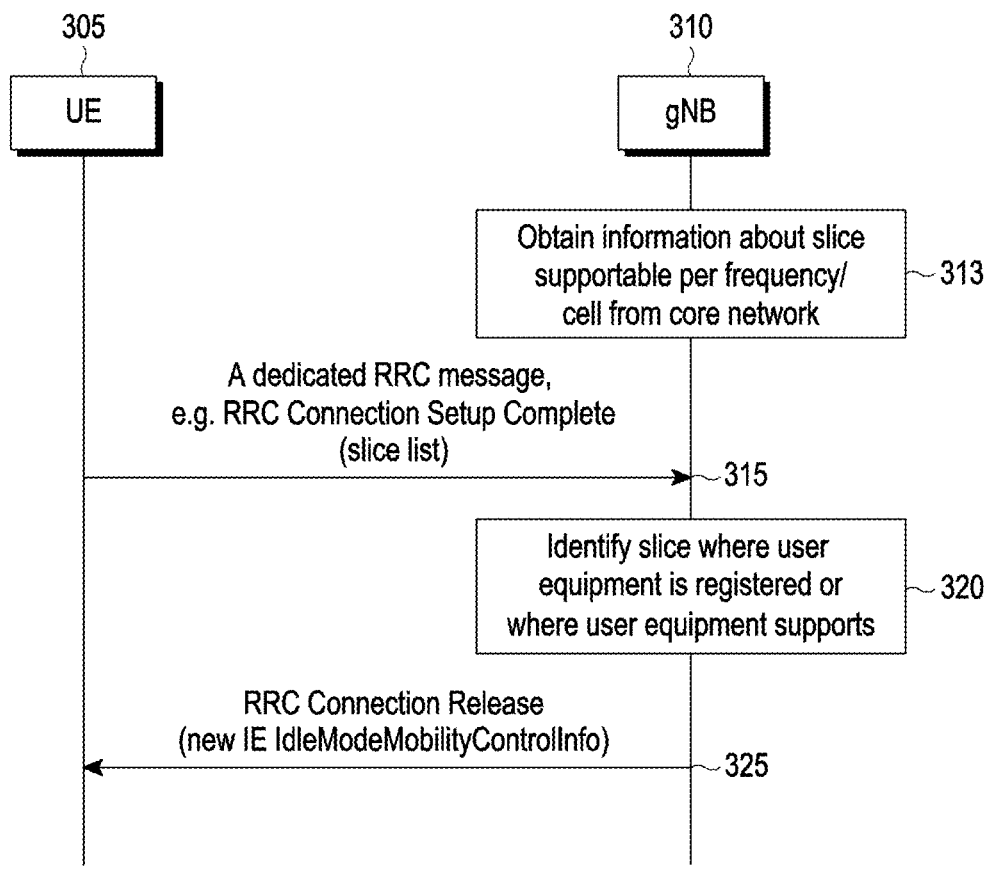
FIG. 3 is a diagram for describing a process in which a base station receives slice information from a user equipment according to an embodiment of the present disclosure.

FIG. 3 is a diagram for describing a process in which a base station receives slice information from a user equipment according to an embodiment of the present disclosure.

Firstly, a base station 310 may receive slice information supportable per frequency or cell from a core network (for example, an AMF) connected to the base station 310. At this time, the slice information may be used for providing priority information per frequency or cell to be applied on cell reselection when a specific user equipment is transitioned into an idle mode or a connected mode.

A UE 305 may transmit, to the base station 310, information about a slice at which the UE 305 is registered or which the UE 305 supports]. At this time, the information about the slice may be transferred with dedicated RRC signaling. For example, a RRC Connection Setup Complete message may be used as the dedicated RRC signaling in an RRC establishment process. The base station 310 may implicitly obtain the information about the slice at which the UE 305 is registered or which the UE 305 supports by considering one service. For example, if the UE 305 requests a service with a URLLC attribute, the base station 310 may regard that the UE 305 registers at a slice which corresponds to URLLC or the UE 305 supports the slice which corresponds to the URLLC. If the base station 310 is not connected to an AMF which supports the slice which corresponds to the service which the user equipment 305 requests, the base station 310 may trigger re-direction.

In operation 325, the base station 310 may provide frequency priority information or cell priority information which is necessary for cell reselection of the UE 305 when transitioning the UE 305 into the idle mode or an inactive mode. At this time, the priority information may be included in an RRC Connection Release message. The priority information may be valid during specific time, and a timer value indicating information about the time may be included in the RRC Connection Release message. If the timer expires, the UE 305 may regard that the priority information is invalid.

In operation 325, a new IE IdleModeMobilityContolInfo may be included in the RRC Connection Release message, and the IE may include freqPriorityListNR as priority information per frequency for cell reselection. The information may include one or more entries. For each entry which corresponds to one frequency, there may be carrier frequency information (carrierFreq), priority information of a corresponding frequency (cellReselectionPriority), and slice information which is supported in the corresponding frequency (supportedSliceList). One frequency may include one or more slices. The cellReselectionPrioriry information has a value between 0 and 7, and 0 may mean the lowest priority. The supportedSliceList is a list indicating slices which the frequency supports, and a Single Network Slice Selection Assistance Information (S-NSSAI) value indicating a slice may be used. The S-NSSAI may consist of an SST and an SD. The SST is a slice type, and the SD is a slice differentiator. The S-NSSAI may have a regular value or a network specific value, and the regular value may indicate an eMBB, URLCC, and MIoT (mMTC). For example, the user equipment may transmit, to a network, NSSAI information which consists of up to 8 S-NSSAIs.

TABLE 2

| | | |
|---|---|---|
| IdleModeMobilityControlInfo ::= | SEQUENCE { | |
| freqPriorityListNR | FreqPriorityListNR | OPTIONAL, |
| -- Need ON | | |
| } | | |
| FreqPriorityListNR ::= | SEQUENCE (SIZE (1..maxFreq)) OF FreqPriorityNR | |
| FreqPriorityNR ::= | SEQUENCE { | |
| carrierFreq | ARFCN-ValueNR, | |
| cellReselectionPriority | CellReselectionPriority | |
| supportedSliceList | SupportedSliceList | |
| } | | |

Figure 4:
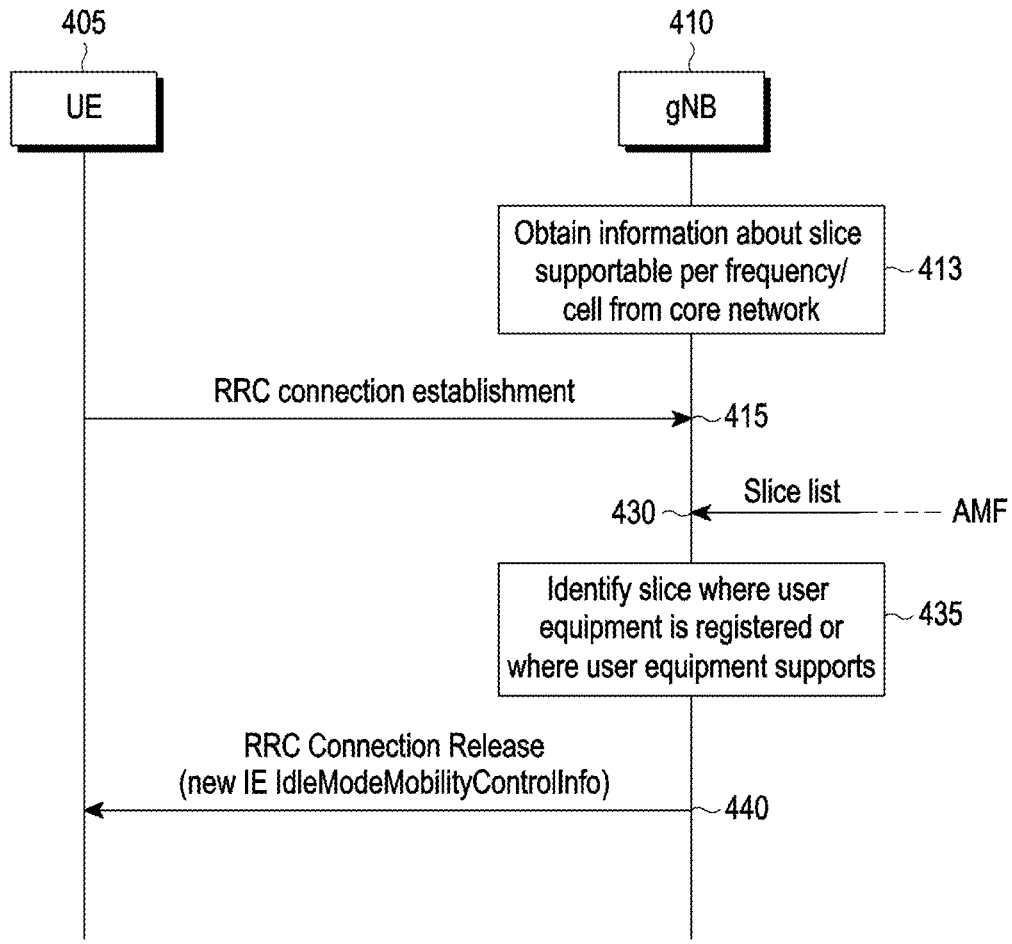
FIG. 4 is a diagram for describing a process in which information related to a specific user equipment is provided from a core network to a base station according to an embodiment of the present disclosure.

An embodiment of the present disclosure has been described with information per frequency as an example in FIG. 3, however, it is not limited to this. For example, it will be noted that information per cell may be provided in the same way. FIG. 4 is a diagram for describing a process in which information related to a specific user equipment is provided from a core network to a base station according to an embodiment of the present disclosure. In operation 413, supportable slice information for each frequency or each cell may be provided from a core network (e.g., an AMF) connected to a gNB 410 to the gNB 410. At this time, the slice information may be used for providing priority information per frequency or cell to be applied on cell selection when the specific UE transitions into an idle mode or a connected mode.

In operation 415, a UE 405 which is on a connected mode may be connected to the gNB 410.

In operation 430, information about a slice at which the UE 405 is registered or which the UE 405 supports may be provided from a core network (e.g., an AMF) to the gNB 410.

In operation 435, the UE 405 transitions into the connected mode to perform an authentication process with the AMF, and the AMF may automatically provide the gNB 410 with the information about the slice where the UE 405 is registered or where the UE 405 supports.

In operation 440, the gNB 410 may provide frequency priority information or cell priority information necessary for the UE 405 to reselect a cell when transitioning the UE 405 into the idle mode or an inactive mode. At this time, the priority information may be included in an RRC Connection Release message. The priority information may be valid during specific time, and a timer value indicating information about the time may be included in the RRC Connection Release message. If the timer expires, the user equipment 405 may regard that the priority information is invalid.

Figure 5:
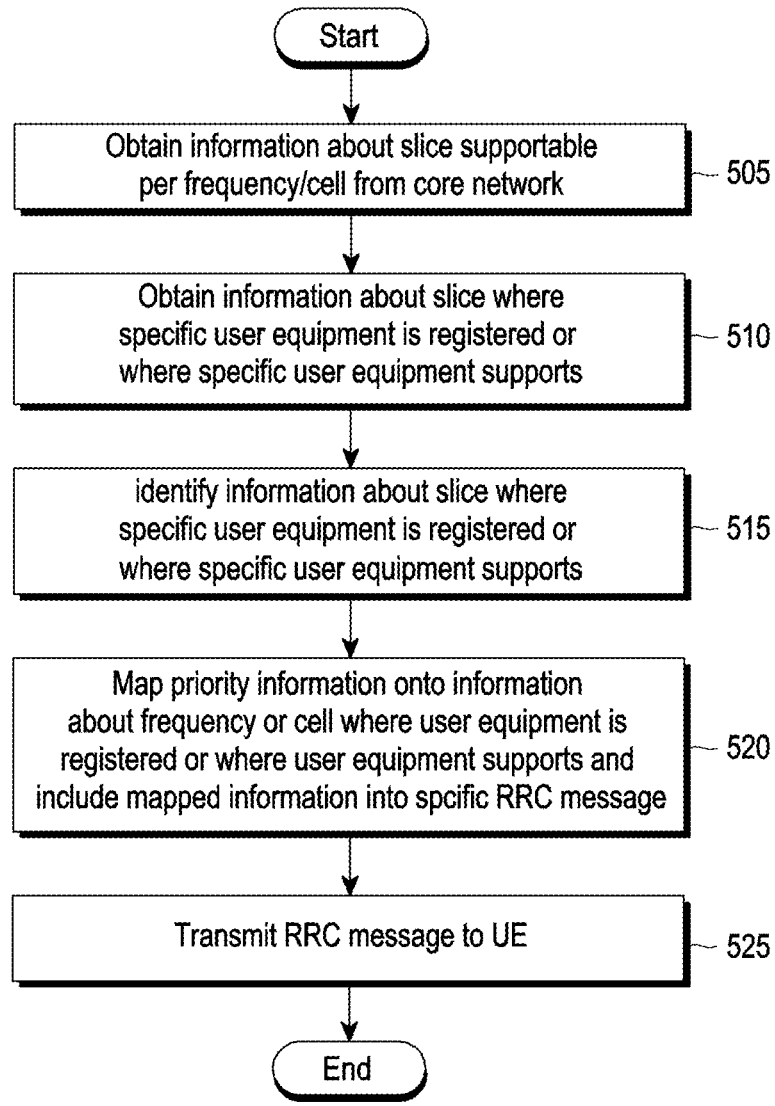
FIG. 5 is a diagram for describing an operation of a base station according to an embodiment of the present disclosure.

FIG. 5 is a diagram for describing an operation of a base station according to an embodiment of the present disclosure.

In operation 505, supportable slice information for each frequency or each cell is provided from a core network to a base station.

In operation 510, information about a slice at which a specific user equipment is registered or which the specific user equipment supports is provided from a user equipment or the core network to the base station.

In operation 515, the base station identifies the information about the slice at which the specific user equipment is registered or which the specific user equipment supports from the provided information about the slice. In operation 520, the base station maps priority information to information about a frequency or a cell which supports the slice at which the user equipment is registered or which the user equipment supports. The base station includes information to which the priority information is mapped into a specific RRC message.

In operation 525, the base station transmits the specific RRC message.

Figure 6:
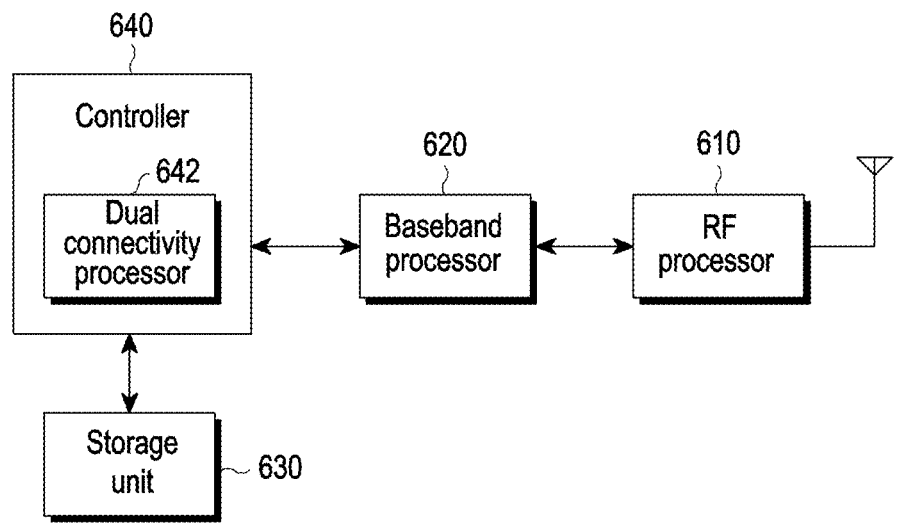
FIG. 6 is a block diagram illustrating a structure of a user equipment according to an embodiment of the present disclosure.

FIG. 6 is a block diagram illustrating a structure of a user equipment according to an embodiment of the present disclosure. Referring to FIG. 6, a user equipment may include a Radio Frequency (RF) processor 610, a baseband processor 620, a storage 630, and a controller 640.

The RF processor 610 may perform a function for transmitting and receiving a signal through a radio channel such as band conversion, amplification, and/or the like. That is, the RF processor 610 may up-convert a baseband signal provided from the baseband processor 620 into an RF band signal to transmit the RF band signal through an antenna, and down-convert an RF band signal received through the antenna into a baseband signal. For example, the RF processor 610 may include a transmission filter, a reception filter, an amplifier, a mixer, an oscillator, a digital to analog convertor (DAC), an analog to digital convertor (ADC), and/or the like. Although one antenna is illustrated in FIG. 6, the user equipment may include a plurality of antennas. Further, the RF processor 610 may include a plurality of RF chains. The RF processor 610 may perform beamforming. For the beamforming, the RF processor 610 may adjust a phase and a magnitude of each of signals transmitted and received through the plurality of antennas or antenna elements. The RF processor 610 may perform a multiple input multiple out (MIMO) operation, and receive a plurality of layers upon performing the MIMO operation.

The baseband processor 620 may perform a transformation function between a baseband signal and a bit stream according to a physical layer standard of a system. For example, the baseband processor 620 may encode and modulate a transmission bit stream to generate complex symbols upon data transmission. The baseband processor 620 may recover a reception bit stream by demodulating and decoding a baseband signal provided from the RF processor 610 upon data reception. For example, in a case of following an orthogonal frequency division multiplexing (OFDM) scheme, upon data transmission, the baseband processor 620 may encode and modulate a transmission bit stream to generate complex symbols, map the complex symbols to subcarriers, and generate OFDM symbols by an inverse fast Fourier transform (IFFT) operation and cyclic prefix (CP) insertion. Upon data reception, the baseband processor 620 may divide a baseband signal provided from the RF processor 610 on an OFDM symbol basis, recover signals mapped to subcarriers by a fast Fourier transform (FFT) operation, and recover a reception bit stream though demodulation and decoding.

As described above, the baseband processor 620 and the RF processor 610 may transmit and receive a signal. According to this, the baseband processor 620 and the RF processor 610 may be referred to as or commonly called a transmitter, a receiver, a transceiver, or a communication unit. At least one of the baseband processor 620 and the RF processor 610 may include a plurality of communication modules for supporting different radio access technologies. At least one of the baseband processor 620 and the RF processor 610 may include different communication modules for processing signals on different frequency bands. For example, the different radio access technologies may include wireless LAN (e.g., IEEE 802.11), a cellular network (e.g., LTE) and/or the like. The different frequency bands may include a super high frequency (SHF)(e.g., 2.NRHz and NRhz) band, and a millimeter wave (e.g., 60 GHz) band.

The storage 630 may store a basic program for an operation of the user equipment, an application program, configuration information, and/or the like. Specially, the storage 630 may store information related to the second access node which performs a wireless communication using the second radio access technology. The storage 630 provides stored data according to request of the controller 640.

The controller 640 controls the overall operations of the user equipment. For example, the controller 640 may transmit and receive a signal through the baseband processor 620 and the RF processor 610. The controller 640 may record data into the storage 630 and read data from the storage 630. For this, the controller 640 may include at least one processor. For example, the controller 640 may include a communication processor (CP) which performs control for a communication and an application processor (AP) which controls an upper layer such as an application program, and/or the like.

Figure 7:
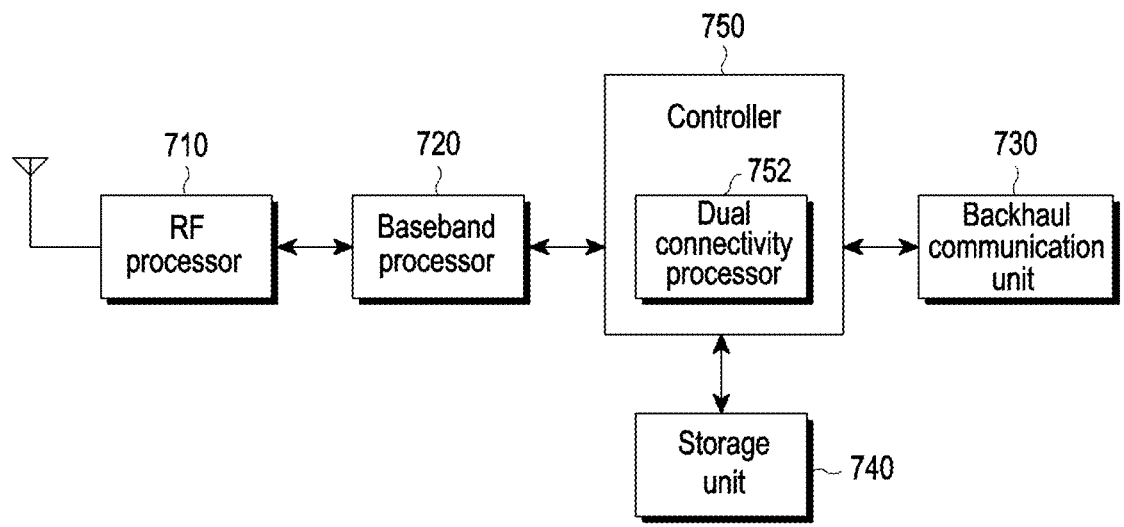
FIG. 7 is a diagram illustrating a structure of a primary base station in a wireless communication system according to an embodiment of the present disclosure.

FIG. 7 is a diagram illustrating a structure of a primary base station in a wireless communication system according to an embodiment of the present disclosure.

Referring to FIG. 7, a base station may include an RF processor 710, a baseband processor 720, a backhaul communication unit 730, a storage unit 740, and a controller 750.

The RF processor 710 may perform a function for transmitting and receiving a signal through a radio channel such as band conversion, amplification, and/or the like. That is, the RF processor 710 may up-convert a baseband signal provided from the baseband processor 720 into an RF band signal to transmit the RF band signal through an antenna, and down-convert an RF band signal received through the antenna into a baseband signal. For example, the RF processor 710 may include a transmission filter, a reception filter, an amplifier, a mixer, an oscillator, a DAC, an ADC, and/or the like. Although one antenna is illustrated in FIG. 7, the first access node may include a plurality of antennas. Further, the RF processor 710 may include a plurality of RF chains. The RF processor 710 may perform beamforming. For the beamforming, the RF processor 710 may adjust a phase and a magnitude of each of signals transmitted and received through the plurality of antennas or antenna elements. The RF processor 710 may perform a downlink MIMO operation by transmitting one or more layers.

The baseband processor 720 may perform a transformation function between a baseband signal and a bit stream according to a physical layer standard of the first radio access technology. For example, the baseband processor 720 may encode and modulate a transmission bit stream to generate complex symbols upon data transmission. The baseband processor 720 may recover a reception bit stream by demodulating and decoding a baseband signal provided from the RF processor 710 upon data reception. For example, in a case of following an OFDM scheme, upon data transmission, the baseband processor 720 may encode and modulate a transmission bit stream to generate complex symbols, map the complex symbols to subcarriers, and generate OFDM symbols by an IFFT operation and CP insertion. Upon data reception, the baseband processor 720 may divide a baseband signal provided from the RF processor 710 on an OFDM symbol basis, recover signals mapped to subcarriers by an FFT operation, and recover a reception bit stream though demodulation and decoding. The baseband processor 720 may transmit and receive a signal as described above. According to this, the baseband processor 720 and the RF processor 710 may be referred to as or commonly called a transmitter, a receiver, a transceiver, a communication unit, or a wireless communication unit.

The backhaul communication unit 730 may provide an interface for communicating with other nodes within a network. That is, the backhaul communication unit 730 may convert a bit stream which is transmitted from the primary base station to other node, e.g., a secondary base station, a core network, and/or the like into a physical signal, and convert a physical signal received from the other node into a bit stream.

The storage unit 740 may store a basic program for an operation of the primary base station, an application program, configuration information, and/or the like. Specially, the storage unit 740 may store information for a bearer allocated to an accessed user equipment, a measurement result reported from the accessed user equipment, and/or the like. The storage unit 740 may store information which is a criterion for determining whether to provide a user equipment with dual connectivity or stop the dual connectivity. The storage unit 740 may provide stored data according to request of the controller 750.

The controller 750 controls the overall operations of the primary base station. For example, the controller 750 may transmit and receive a signal through the baseband processor 720, the RF processor 710, and the backhaul communication unit 730. The controller 750 may record data into the storage unit 740 and read data from the storage unit 740. For this, the controller 750 may include at least one processor.

Figure 8:
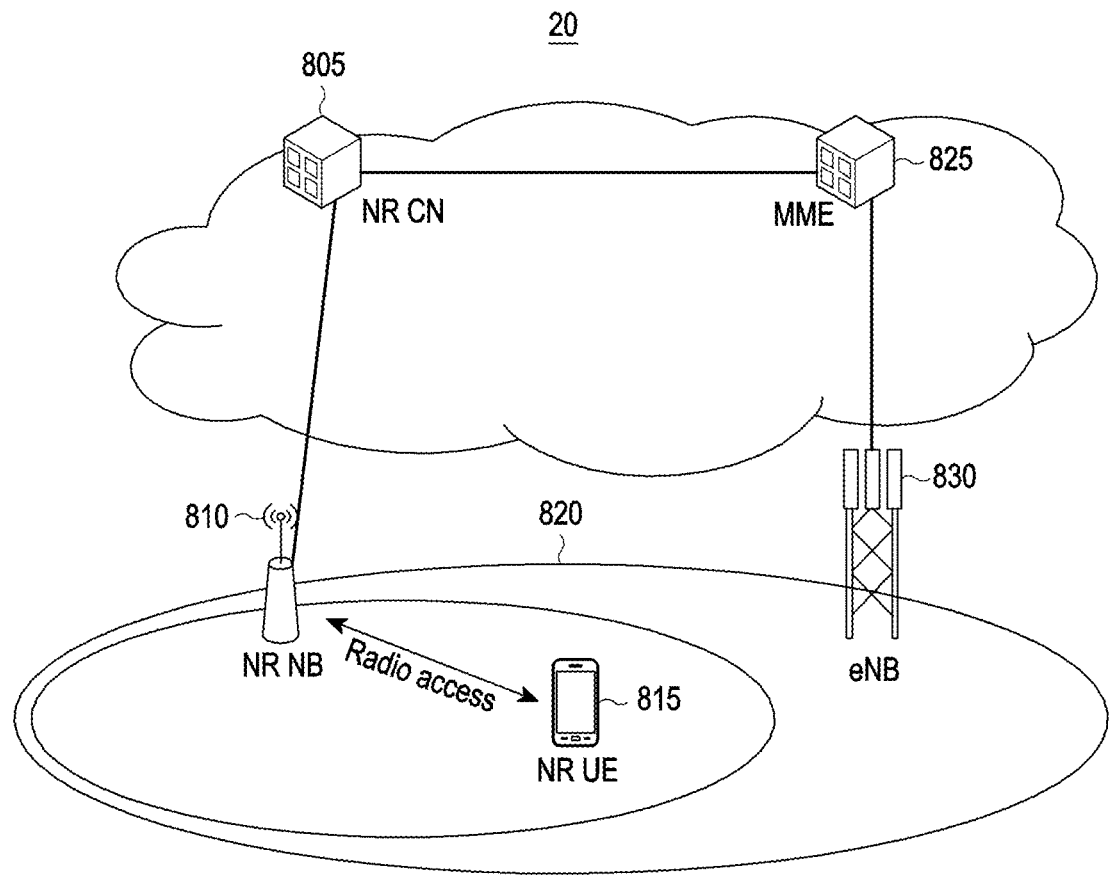
FIG. 8 is a diagram illustrating a structure of a wireless communication system according to an embodiment of the present disclosure.

FIG. 8 is a diagram illustrating a structure of a wireless communication system according to an embodiment of the present disclosure.

Referring to FIG. 8, a wireless communication system 20 includes a New Radio Node B (NR NB) 810, a New Radio Core Network (NR CN) 805, a New Radio User Equipment (NR UE, UE or user equipment) 815, an MME 825, and an Evolved Node B (eNB) 830. A radio access network consists of the NR NB 810 and the NR CN 805. The NR UE 815 accesses an external network through the NR NB 810 and the NR CN 805.

In FIG. 8, the NR NB 810 corresponds to an eNB of an existing LTE system. The NR NB 810 is connected to the NR UE 815 through a radio channel, and may provide a service superior to an existing eNB. In the next generation-mobile communication system, all user traffic is serviced through a shared channel, so there is a need for an apparatus for collecting buffer status, available transmission power status, channel status, and/or the like to perform scheduling, and the NR NB 810 is responsible for this. Generally, the NR NB 810 controls a plurality of cells. In order to implement super-high speed data transmission compared to the existing LTE, the NR NB 810 may have a maximum bandwidth which is wider than or equal to an existing-maximum bandwidth, and incorporate a beamforming technology into an Orthogonal Frequency Division Multiplexing (OFDM) scheme as a radio access technology. Further, an Adaptive Modulation & Coding (AMC) scheme for determining a modulation scheme and a channel coding rate based on channel status of the user equipment 815 is applied. The NR CN 805 may perform a function to support mobility, a function to establish a bearer, a function to configure QoS, and/or the like. The NR CN 805 is an apparatus responsible for various control functions as well as a function to manage mobility of the user equipment 815, and may be connected to a plurality of base stations. The 5th generation-communication system may interact with an existing LTE system, and the NR CN 805 is connected to the MME 825 through a network interface. The MME 825 is connected to the eNB 830 as an existing base station.

The present disclosure proposes a method of mitigating overheating of a communication modem chip set of a user equipment in a case that the communication modem chip set overheats. An overheating problem may occur when a base station provides the user equipment with a configuration related to high performance-transmission. For example, high level-modulation or MIMO, configuration of a plurality of serving cells, and/or the like may cause an overheating problem.

Figure 9:
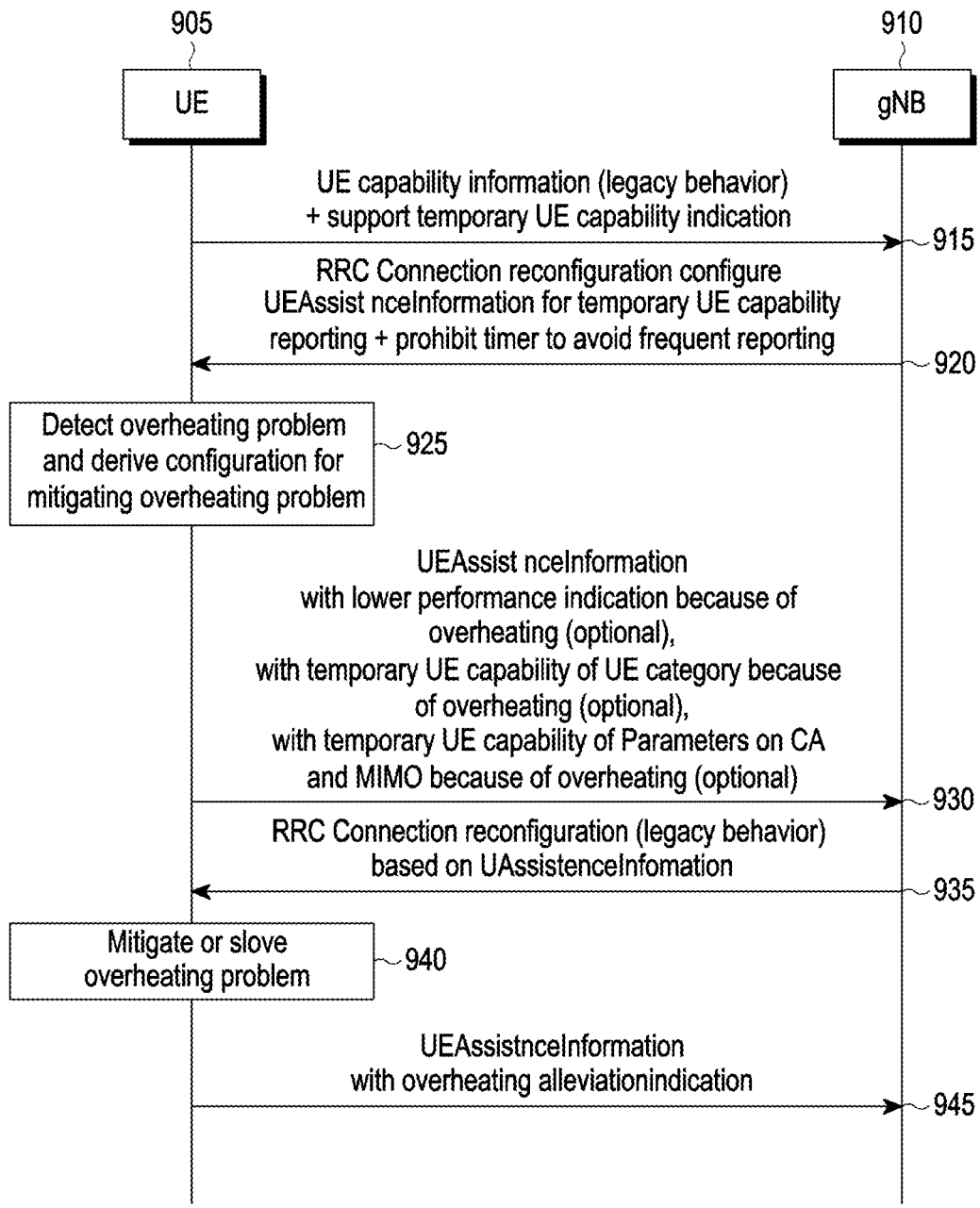
FIG. 9 is a diagram illustrating signal flow related to an operation for solving an overheating problem of a user equipment according to an embodiment of the present disclosure.

FIG. 9 is a diagram illustrating signal flow related to an operation for solving an overheating problem of a user equipment according to an embodiment of the present disclosure.

In operation 915, a UE 905 may report capability information of the UE 905 to a gNB (E-UTRAN) 910 according to request of the gNB 910. At this time, the report may include information indicating that the UE 905 has capability of reporting an overheating problem when the overheating problem occurs. In the present disclosure, this will be referred to as temporary UE capability indication.

In operation 920, the gNB 910 may command, using an RRC Connection Reconfiguration message, the UE 905 to report occurrence of an overheating problem if the overheating problem occurs and mitigation of the overheating problem is necessary. In order to prevent frequently transmitting the report of the occurrence of the overheating problem, the gNB 910 may set a timer. After the report, the timer starts, and the UE 905 may not retransmit the report to the gNB 910 until the timer expires.

In operation 925, upon detecting the overheating problem, the UE 905 may derive configuration for mitigating the overheating problem.

In operation 930, the UE 905 transmits configuration information which the UE 905 derives to a base station. At this time, a UEAssistanceInformation may be used, and the configuration information may be:

1) one-bit indicator indicating that an overheating problem occurs,
2) UE category which a UE prefers to temporarily apply,
3) Carrier Aggregation (CA)/MIMO-related RF-Parameter which a UE prefers to temporarily apply, and/or the like.

In operation 935, the gNB 910 receives a message and transmits reconfiguration information to the UE 905 by considering the configuration information.

At operation 940, the UE 905 applies the reconfiguration information to improve or mitigate the overheating problem. If the overheating problem is improved or mitigated, the UE

905 transmits a UEAssistanceInformation message to the E-UTRAN 910. The UEAssistanceInformation message may indicate that the reconfiguration information which is temporarily applied is not required any more.

Meanwhile, the UE category among the configuration information may be related to a max TB size, a soft channel bit, an L2 buffer size, whether to support a UL 64 QAM, and/or the like. Parameters which affect the overheating problem among the configuration information are the max TB size, the soft channel bit, and whether to support UL 64 QAM, and the L2 buffer size has no effect for solving the overheating problem. Otherwise, changing the L2 buffer size may be heavy burden in a view of system. So, if the gNB 910 receives the UE category information which the UE prefers in order to solve the overheating problem, it is preferable to reconfigure information which may solve or mitigate overheating except for the L2 buffer size.

Figure 10:
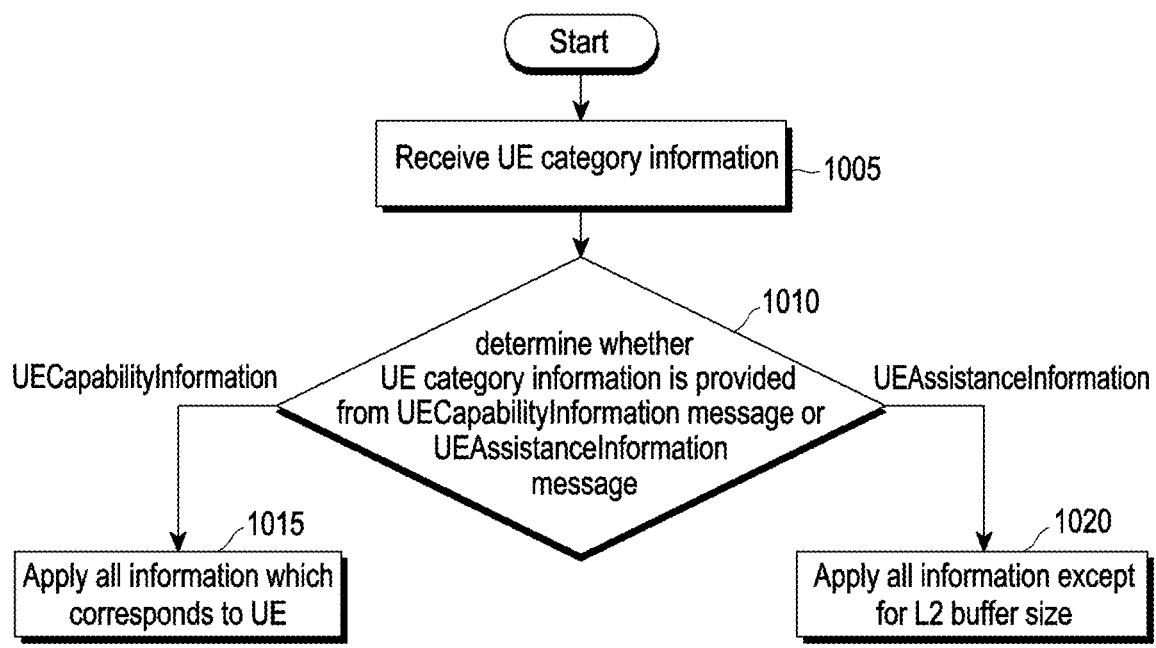
FIG. 10 is a diagram for describing an operation of a base station which processes UE category information transmitted from a user equipment according to an embodiment of the present disclosure.

FIG. 10 is a diagram for describing an operation of a base station which processes UE category information transmitted from a user equipment according to an embodiment of the present disclosure.

In operation 1005, a base station receives temporary UE category information from a user equipment. At this time, temporary UE category may correspond to ue-CategoryDL, ue-CategoryUL, or both.

In operation 1010, the base station determines whether the UE category information is received from the user equipment through a UECapabilityInformation message or a UEAssistanceInformation message.

In operation 1015, if the UE category information is received through the UECapabilityInformation message, the base station applies all information which corresponds to the UE category.

In operation 1020, if the UE category information is received through the UEAssistanceInformation message, the base station applies all information except for an L2 buffer size.

Figure 11:
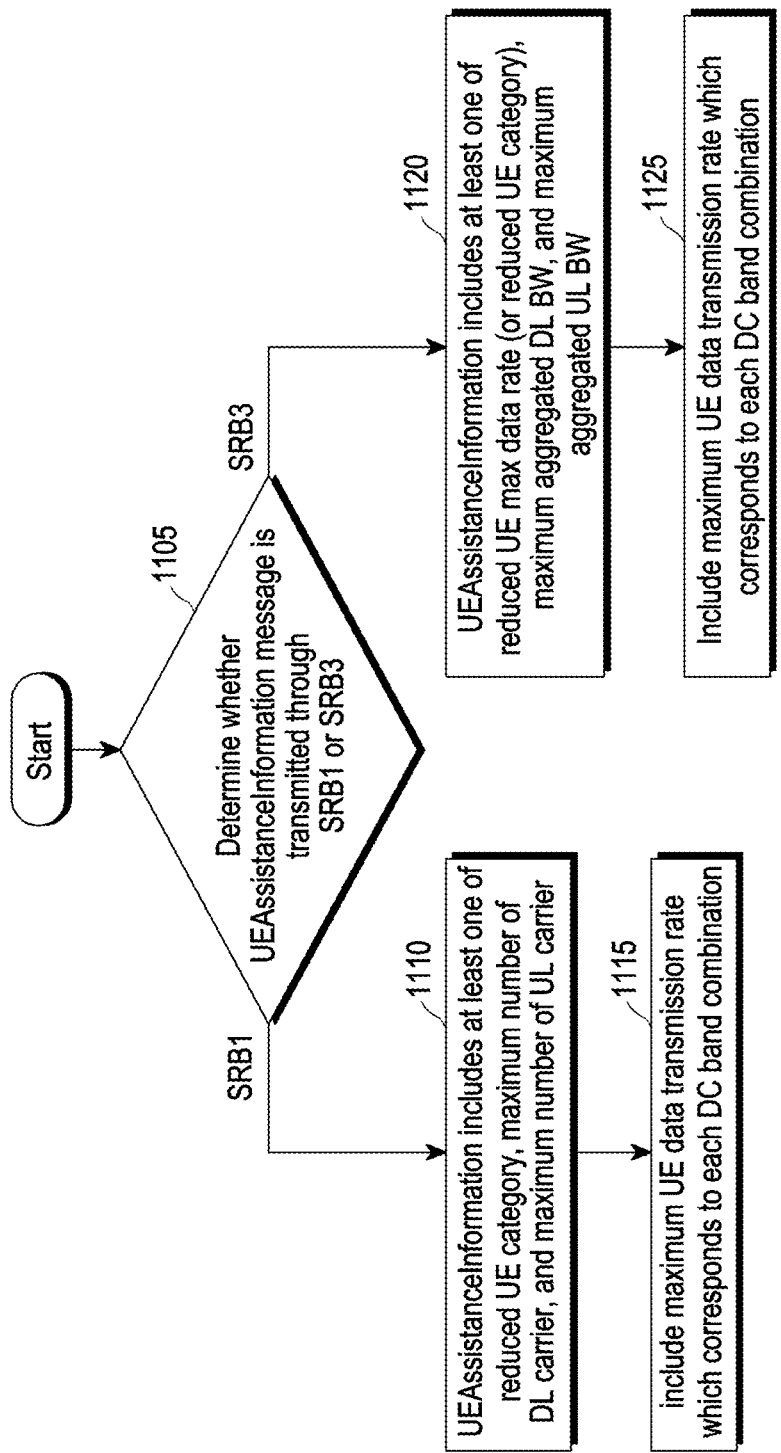
FIG. 11 is a diagram for describing a method for generating a UEAssistanceInformation message in an LTE-NR Dual Connectivity (DC) technology according to an embodiment of the present disclosure.

FIG. 11 is a diagram for describing a method for generating a UEAssistanceInformation message in an LTE-NR Dual Connectivity (DC) technology according to an embodiment of the present disclosure.

LTE-NR Dual Connectivity is a technology in which a user equipment is connected to an LTE system and an NR system at the same time to transmit and receive data. At this time, the LTE system may perform a role of a master. All of the LTE and the NR may transmit and receive RRC control signaling, RRC signaling transmitted and received with the LTE may be transmitted through an SRB1 or an SRB2, and RRC signaling transmitted and received with the NR may be transmitted through an SRB3.

When an overheating problem occurs, the user equipment may transmit configuration information which may mitigate the overheating problem to the LTE system, the NR system, or both of the LTE system and the NR system through the UEAssistanceInformation. In the present disclosure, the configuration information may be varied according to a system in which the UEAssistanceInformation message is transmitted.

In operation 1105, the user equipment determines whether the UEAssistanceInformation message which is triggered according to the overheating problem is transmitted through an SRB1 or an SRB3. At this time, a case that the UEAssistanceInformation message is transmitted through the SRB1 may mean that the message is transmitted through the LTE system.

So, in operation 1110, the UEAssistanceInformation transmitted through the LTE may include at least one of the following configuration.

Reduced UE category.
Maximum number of DL carrier
Maximum number of UL carrier.

At operation 1115, a maximum UE data transmission rate which corresponds to each DC band combination may be included by considering an LTE-NR DC situation.

A case that the message is transmitted through the SRB3 may mean that the message is transmitted through the NR system. So, in operation 1120, the UEAssistanceInformation transmitted through the NR may include at least one of the following configuration information.

Reduced UE max data rate (or reduced UE category).
Maximum aggregated DL BW
Maximum aggregated UL BW In operation 1125, the maximum UE data transmission rate which corresponds to each DC band combination may be included by considering the LTE-NR DC situation.

Figure 12:
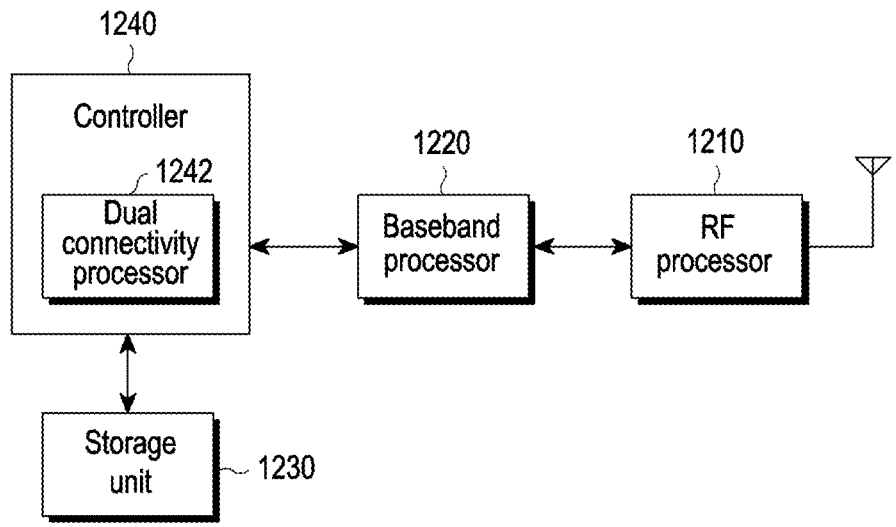
FIG. 12 is a diagram illustrating a structure of a user equipment according to an embodiment of the present disclosure.

FIG. 12 is a block diagram illustrating a structure of a user equipment according to an embodiment of the present disclosure. Referring to FIG. 12, a user equipment may include a Radio Frequency (RF) processor 1210, a baseband processor 1220, a storage 1230, and a controller 1240.

The RF processor 1210 may perform a function for transmitting and receiving a signal through a radio channel such as band conversion, amplification, and/or the like. That is, the RF processor 1210 may up-convert a baseband signal provided from the baseband processor 1220 into an RF band signal to transmit the RF band signal through an antenna, and down-convert an RF band signal received through the antenna into a baseband signal. For example, the RF processor 1210 may include a transmission filter, a reception filter, an amplifier, a mixer, an oscillator, a digital to analog convertor (DAC), an analog to digital convertor (ADC), and/or the like. Although one antenna is illustrated in FIG. 12, the user equipment may include a plurality of antennas. Further, the RF processor 1210 may include a plurality of RF chains. The RF processor 1210 may perform beamforming. For the beamforming, the RF processor 1210 may adjust a phase and a magnitude of each of signals transmitted and received through the plurality of antennas or antenna elements. The RF processor 1210 may perform a MIMO operation, and receive a plurality of layers upon performing the MIMO operation.

The baseband processor 1220 may perform a transformation function between a baseband signal and a bit stream according to a physical layer standard of a system. For example, the baseband processor 1220 may encode and modulate a transmission bit stream to generate complex symbols upon data transmission. The baseband processor 1220 may recover a reception bit stream by demodulating and decoding a baseband signal provided from the RF processor 1210 upon data reception. For example, in a case of following an orthogonal frequency division multiplexing (OFDM) scheme, upon data transmission, the baseband processor 1220 may encode and modulate a transmission bit stream to generate complex symbols, map the complex symbols to subcarriers, and generate OFDM symbols by an inverse fast Fourier transform (IFFT) operation and cyclic prefix (CP) insertion. Upon data reception, the baseband processor 1220 may divide a baseband signal provided from the RF processor 1210 on an OFDM symbol basis, recover signals mapped to subcarriers by a fast Fourier transform (FFT) operation, and recover a reception bit stream though demodulation and decoding.

As described above, the baseband processor 1220 and the RF processor 1210 may transmit and receive a signal. According to this, the baseband processor 1220 and the RF processor 1210 may be referred to as a transmitter, a receiver, a transceiver, or a communication unit. At least one of the baseband processor 1220 and the RF processor 1210 may include a plurality of communication modules for supporting different radio access technologies. At least one of the baseband processor 1220 and the RF processor 1210 may include different communication modules for processing signals on different frequency bands. For example, the different radio access technologies may include wireless LAN (e.g., IEEE 802.11), a cellular network (e.g., LTE) and/or the like. The different frequency bands may include a super high frequency (SHF)(e.g., 2.NRHz and NRhz) band, and a millimeter wave (e.g., 60 GHz) band.

The storage 1230 may store a basic program for an operation of the user equipment, an application program, configuration information, and/or the like. Specially, the storage 1230 may store information related to the second access node which performs a wireless communication using the second radio access technology. The storage 1230 may provide stored data according to request of the controller 1240.

The controller 1240 may control the overall operations of the user equipment. For example, the controller 1240 may transmit and receive a signal through the baseband processor 1220 and the RF processor 1210. The controller 1240 may record data into the storage 1230 and read data from the storage 1230. For this, the controller 1240 may include at least one processor. For example, the controller 1240 may include a communication processor (CP) which performs control for a communication and an application processor (AP) which controls an upper layer such as an application program, and/or the like.

Figure 13:
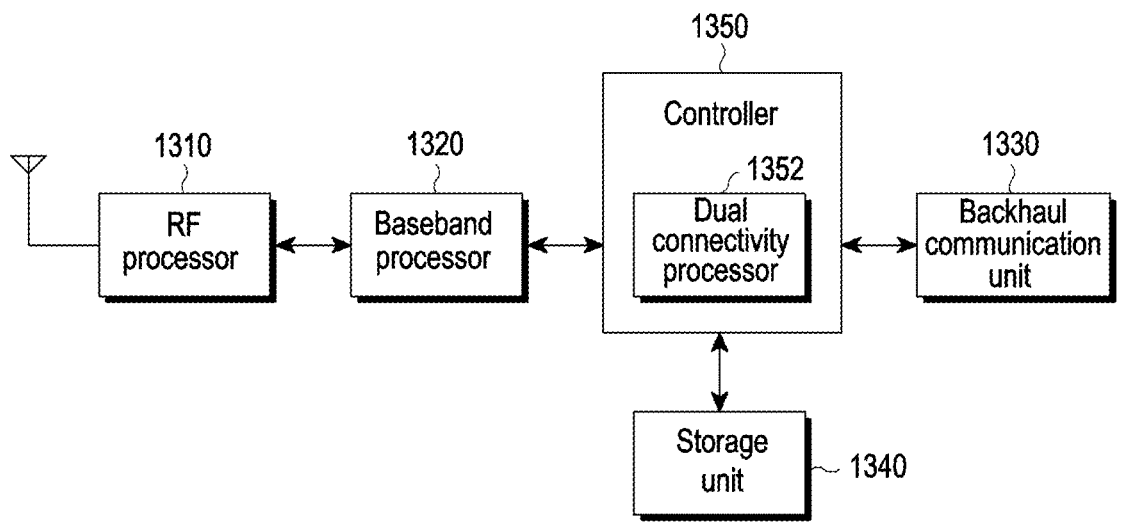
FIG. 13 is a diagram illustrating a structure of a primary base station in a wireless communication system according to an embodiment of the present disclosure.

FIG. 13 is a diagram illustrating a structure of a primary base station in a wireless communication system according to an embodiment of the present disclosure.

Referring to FIG. 13, a base station may include an RF processor 1310, a baseband processor 1320, a backhaul communication unit 1330, a storage unit 1340, and a controller 1350.

The RF processor 1310 may perform a function for transmitting and receiving a signal through a radio channel such as band conversion, amplification, and/or the like. That is, the RF processor 1310 may up-convert a baseband signal provided from the baseband processor 1320 into an RF band signal to transmit the RF band signal through an antenna, and down-convert an RF band signal received through the antenna into a baseband signal. For example, the RF processor 1310 may include a transmission filter, a reception filter, an amplifier, a mixer, an oscillator, a DAC, an ADC, and/or the like. Although one antenna is illustrated in FIG. 13, the first access node may include a plurality of antennas. Further, the RF processor 1310 may include a plurality of RF chains. The RF processor 1310 may perform beamforming. For the beamforming, the RF processor 1310 may adjust a phase and a magnitude of each of the signals transmitted and received through the plurality of antennas or antenna elements. The RF processor 1310 may perform a downlink MIMO operation by transmitting one or more layers.

The baseband processor 1320 may perform a transformation function between a baseband signal and a bit stream according to a physical layer standard of the first radio access technology. For example, the baseband processor 1320 encodes and modulates a transmission bit stream to generate complex symbols upon data transmission. The baseband processor 1320 may recover a reception bit stream by demodulating and decoding a baseband signal provided from the RF processor 1310 upon data reception. For example, in a case of following an OFDM scheme, upon data transmission, the baseband processor 1320 may encode and modulate a transmission bit stream to generate complex symbols, map the complex symbols to subcarriers, and generate OFDM symbols by an IFFT operation and CP insertion. Upon data reception, the baseband processor 1320 may divide a baseband signal provided from the RF processor 1310 on an OFDM symbol basis, recover signals mapped to subcarriers by an FFT operation, and recover a reception bit stream though demodulation and decoding. The baseband processor 1320 may transmit and receive a signal as described above. According to this, the baseband processor 1320 and the RF processor 1310 may be referred to as a transmitter, a receiver, a transceiver, a communication unit, or a wireless communication unit.

The backhaul communication unit 1330 may provide an interface for communicating with other nodes within a network. That is, the backhaul communication unit 1330 may convert a bit stream which is transmitted from the primary base station to other node, e.g., a secondary base station, a core network, and/or the like into a physical signal, and convert a physical signal received from the other node into a bit stream.

The storage unit 1340 may store a basic program for an operation of the primary base station, an application program, configuration information, and/or the like. Specially, the storage unit 1340 may store information for a bearer allocated to an accessed user equipment, a measurement result reported from the accessed user equipment, and/or the like. The storage unit 1340 may store information which is a criterion for determining whether to provide a user equipment with dual connectivity or stop the dual connectivity. The storage unit 1340 may provide stored data according to request of the controller 1350.

The controller 1350 controls the overall operations of the primary base station. For example, the controller 1350 may transmit and receive a signal through the baseband processor 1320, the RF processor 1310, and the backhaul communication unit 1330. The controller 1350 may record data into the storage unit 1340 and read data from the storage unit 1340. For this, the controller 1350 may include at least one processor.

Figure 14:
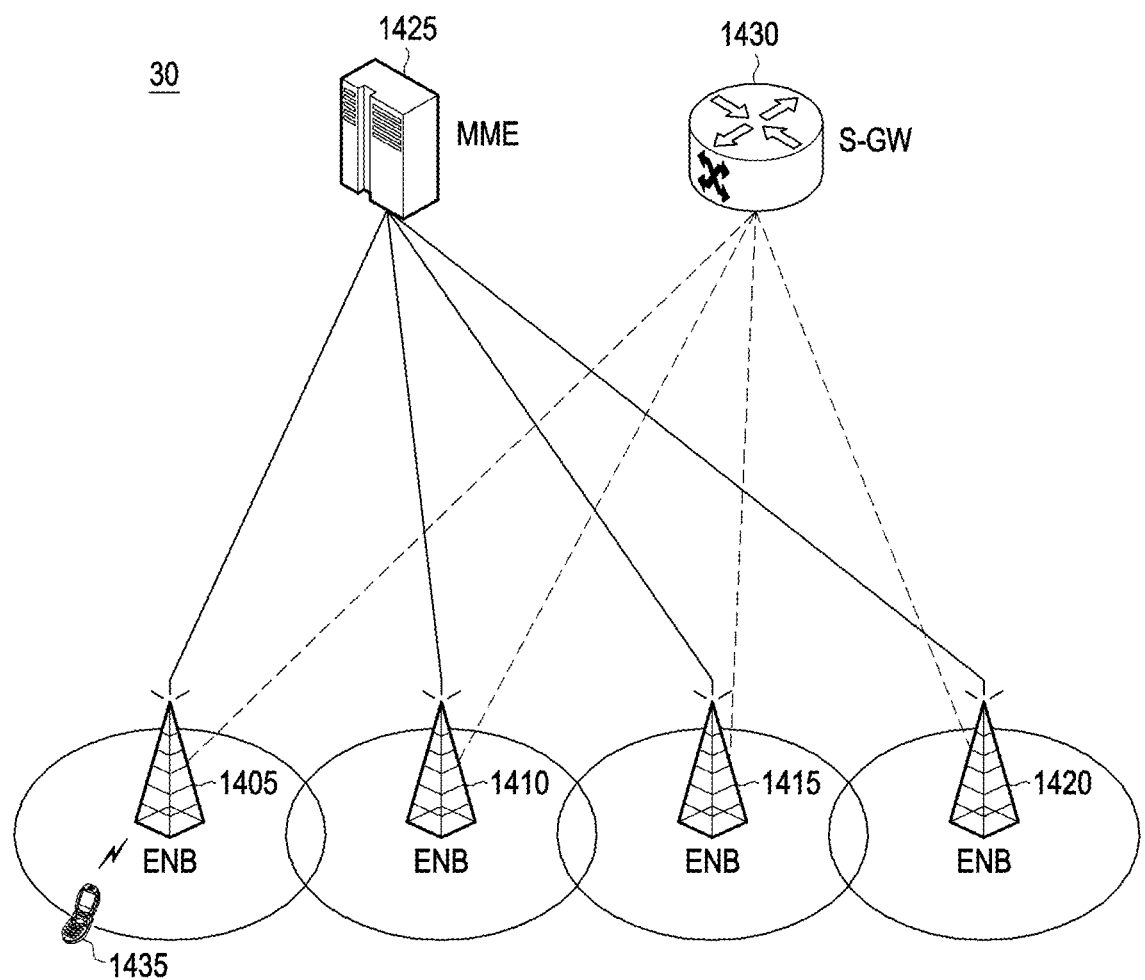
FIG. 14 is a diagram illustrating a structure of a wireless communication system according to an embodiment of the present disclosure.

FIG. 14 is a diagram illustrating a structure of a wireless communication system according to an embodiment of the present disclosure.

Referring to FIG. 14, a wireless communication system 30 includes a plurality of base stations 1405, 1410, 1415, and 1420, a Mobility Management Entity (MME) 1425, and a Serving-Gateway (S-GW) 1430. A User Equipment (hereinafter, will be referred to as UE or terminal) 1435 accesses an external network through the base stations 1405, 1410, 1415, and 1420 and the S-GW 1430.

The plurality of base stations 1405, 1410, 1415, and 1420 are access nodes of a cellular network and provide radio access to terminals which access a network. That is, the base stations 1405, 1410, 1415, and 1420 collect status information such as buffer status, available transmission power status, channel status, and/or the like of user equipments to perform scheduling and support a connection among the user equipments and a Core network (CN) in order to service users' traffic. The MME 1425 is an apparatus which is responsible for various control functions as well as a mobility management function for the user equipment 1435 and is connected to the plurality of base stations, and the S-GW 1430 is an apparatus which provides a data bearer. Further, the MME 1425 and the S-GW 1430 may perform authentication, bearer management, and/or the like for the user equipment 1435, and may process a packet received from the plurality of base stations 1405, 1410, 1415, and 1420 and a packet to be transmitted to the plurality of base stations 1405, 1410, 1415, and 1420.

Figure 15:
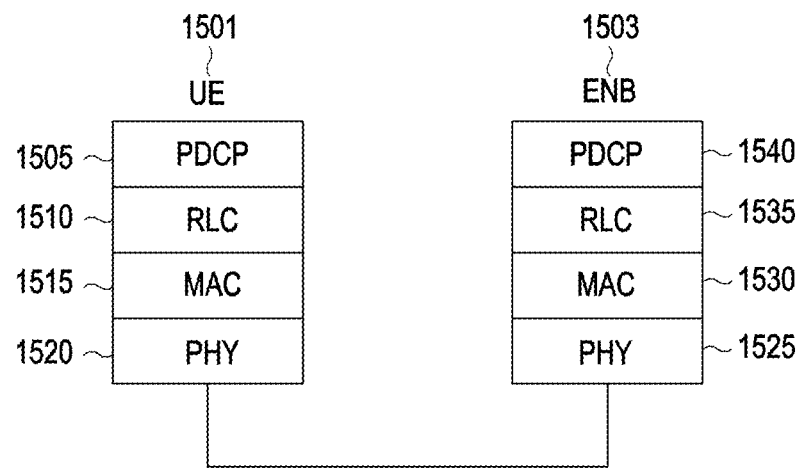
FIG. 15 is a diagram illustrating a structure of a radio protocol in a wireless communication system according to an embodiment of the present disclosure.

FIG. 15 is a diagram illustrating a structure of a radio protocol in a wireless communication system according to an embodiment of the present disclosure.

Referring to FIG. 15, a radio protocol of a wireless communication (e.g., an LTE) system according to an embodiment of the present disclosure may include Packet Data Convergence Protocols (PDCPs) 1505 and 1540, Radio Link Controls (RLCs) 1510 and 1535, and Medium Access Controls (MACs) 1515 and 1530 in a user equipment 1501 and an ENB 1503. The Packet Data Convergence Protocols (PDCPs) 1505 and 1540 are responsible for an operation such as IP header compression/recovery, and/or the like, and the Radio Link Controls (RLCs) 1510 and 1535 reconfigure a PDCP Packet Data Unit (PDU) with a suitable size. The MACs 1515 and 1530 are connected to a plurality of RLC layer apparatuses configured in one user equipment, and perform an operation for multiplexing RLC PDUs into a MAC PDU, and de-multiplexing a MAC PDU into RLC PDUs. Physical layers 1520 and 1525 perform an operation for channel encoding and modulating upper layer data to generate an OFDM symbol and transmitting the OFDM symbol through a radio channel, or an operation for demodulating and channel decoding an OFDM symbol received through the radio channel to transfer the channel decoded signal to a upper layer. The physical layers 1520 and 1525 use a Hybrid ARQ (HARQ) for additional error correction, and a receiving end transmits 1 bit indicating whether a packet transmitted at a transmitting end is received. This will be referred to as HARQ ACK/NACK information. Downlink HARQ ACK/NACK information for uplink transmission may be transmitted through a Physical Hybrid-ARQ Indicator Channel (PHICH) physical channel, and uplink HARQ ACK/NACK information for downlink transmission may be transmitted through a Physical Uplink Control Channel (PUCCH) or Physical Uplink Shared Channel (PUSCH) physical channel.

Although not shown in FIG. 15, a Radio Resource Control (RRC) layer exists on an upper layer of a PDCP layer of each of the UE 1501 and the ENB 1503, and the RRC layer may transmit and receive a configuration control message related to an access and measurement for radio resource control.

Meanwhile, the PHY layers 1520 and 1525 may consist of one or a plurality of frequencies/carriers, and a technology for configuring the plurality of frequencies at the same time and using them will be referred to as a carrier aggregation (CA) technology. At this time, the CA technology may significantly increase transmission amount by the number of secondary carriers by using a primary carrier and one or a plurality of secondary carriers for communication between a terminal (or a User Equipment, or a UE) and a base station (an E-UTRAN NodeB, or an eNB) instead of using one carrier for the communication between the terminal and the base station. A cell within a base station which uses the primary carrier is referred to as a Primary Cell (PCell), and a secondary carrier is referred to as a Secondary Cell (SCell).

Figure 16:
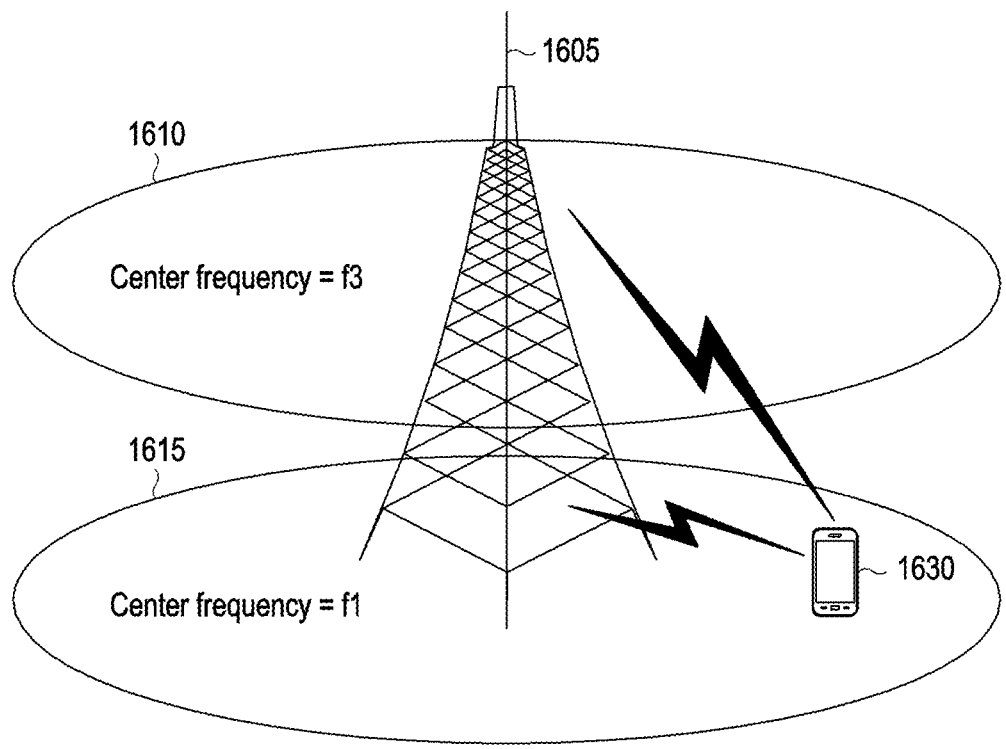
FIG. 16 is a diagram for describing a carrier aggregation technology in a user equipment according to an embodiment of the present disclosure.

FIG. 16 is a diagram for describing a carrier aggregation technology in a user equipment according to an embodiment of the present disclosure.

Referring to FIG. 16, generally, multiple carriers are transmitted and received across a plurality of frequency bands in one base station. For example, when a base station 1605 transmits a carrier 1615 with a center frequency f1 and a carrier 1610 with a center frequency f3, a user equipment which does not support carrier aggregation, i.e., a user equipment which has no carrier aggregation capability transmits and receives data using one of the two carriers. However, a user equipment which supports carrier aggregation, i.e., a user equipment which has carrier aggregation capability may transmit and receive data using a plurality of carriers at the same time. The base station 1605 may increase a transmission speed of a user equipment 1630 by allocating more carriers to the user equipment 1630 which has carrier aggregation capability according to a situation.

When one downlink carrier and one uplink carrier which are transmitted and received in one base station configure one cell, it will be understood that carrier aggregation means that a user equipment transmits and receives data through a plurality of cells at the same time. A maximum transmission speed increases in proportion to the number of carriers which are aggregated based on this.

Hereinafter, in explaining the present disclosure, a case that a user equipment receives data through an arbitrary downlink carrier or transmits data through an arbitrary uplink carrier means a case that the user equipment transmits and receives data using a control channel and a data channel provided by a cell which corresponds to a center frequency and a frequency band which specifies the carrier. Hereinafter, an embodiment of the present disclosure will assume an LTE system for convenience, however, the present disclosure may be applied to various wireless communication systems which support carrier aggregation.

Figure 17:
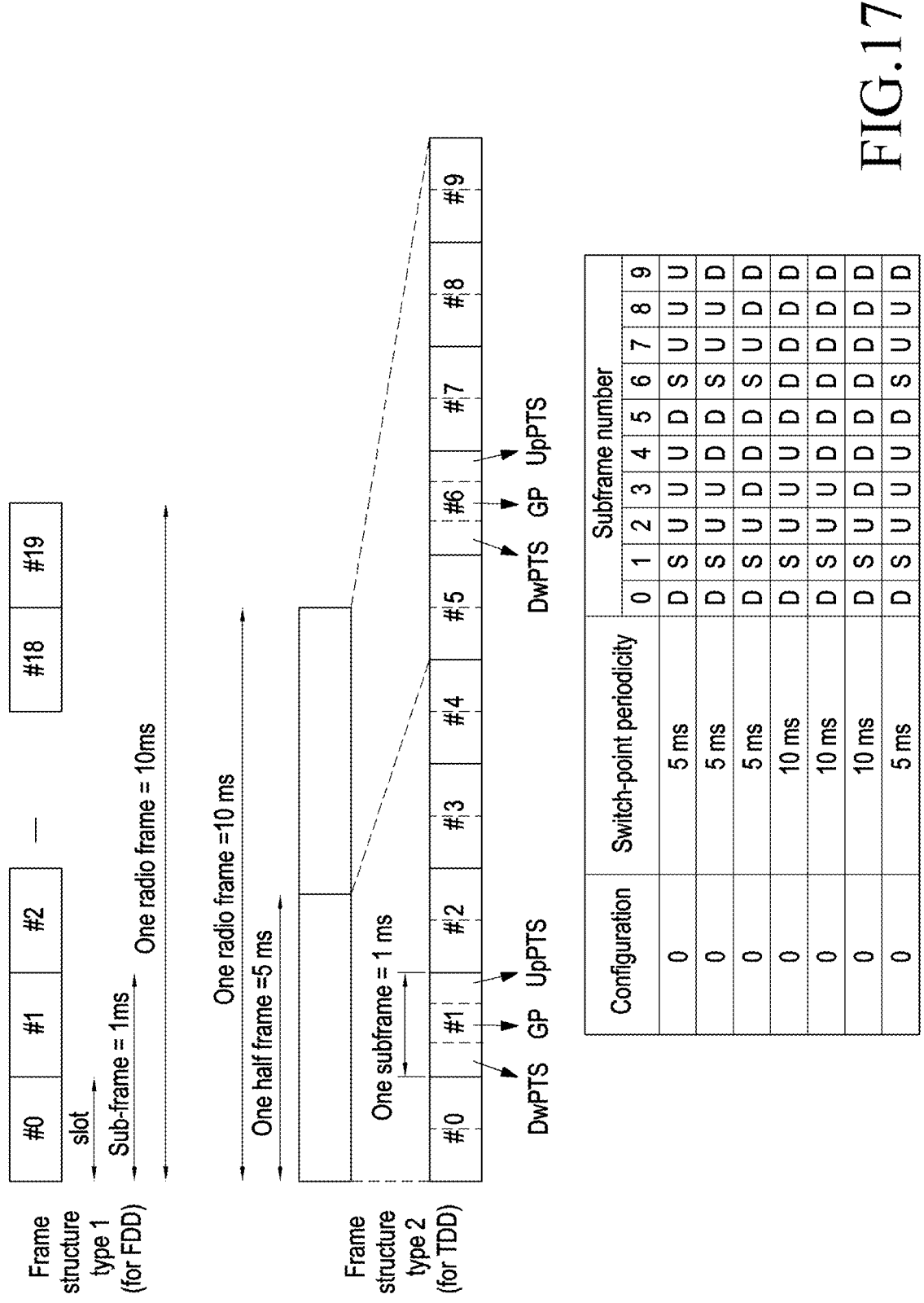
FIG. 17 is a diagram illustrating a frame structure of a wireless communication system according to an embodiment of the present disclosure.

FIG. 17 is a diagram illustrating a frame structure of a wireless communication system according to an embodiment of the present disclosure. Specially, FIG. 17 is a diagram illustrating a frame structure of Frame Structure Type 1 for a Frequency Division Duplex (FDD) system and a frame structure of Frame Structure Type 2 for a Time Division Duplex (TDD) system.

Referring to FIG. 17, in an LTE, a length of one frame of both of Frame Structure Type 1 and Frame Structure Type 2 is 10 ms, and the one frame is divided into 10 sub-frames with a length of 1 ms (#0, #1, #2, . . . , #9). Concept of the sub-frame is the same in an NR, and one sub-frame has an absolute length of 1 ms in the NR. In the NR, one or more slots may exist within the sub-frame according to an interval between secondary carriers.

Meanwhile, in a case of Frame Structure Type 1 in the LTE, a downlink and an uplink exist in different frequencies, so an entire sub-frame is used as the downlink or the uplink. In a case of Frame Structure Type 2, referring to a table in FIG. 17, sub-frames #0, #2, #3, #4, #5, #7, #8, and #9 may be used as a downlink sub-frame (marked as 'D' in the table) or a uplink sub-frame (marked as 'U' in the table) according to TDD configuration. That is, in a case of TDD configuration 0, sub-frames #0 and #5 are used as downlink sub-frames, and sub-frames #2, #3, #4, #7, #8, and #9 are used as uplink sub-frames. In a case of TDD configuration 1, sub-frames #0, #4, #5, and #9 are used as downlink sub-frames, and sub-frames #2, #3, #7, and #8 are used as uplink sub-frames.

In FIG. 17, sub-frames #1 and #6 are special sub-frames which exist in a switching interval from a downlink into an uplink. That is, this is divided into three durations such as a Downlink Pilot Time Slot (DwPTS), a Guard Period (GP), and a Uplink Pilot Time Slot (UpPTS). In the DwPTS duration, downlink data transmission is possible. In the UpPTS duration, uplink data transmission is impossible and transmission of a sounding reference signal (e.g., a Sounding Reference Symbol (SRS)), and/or the like is possible. The GP is an idle duration between the downlink and the uplink.

Figure 18:
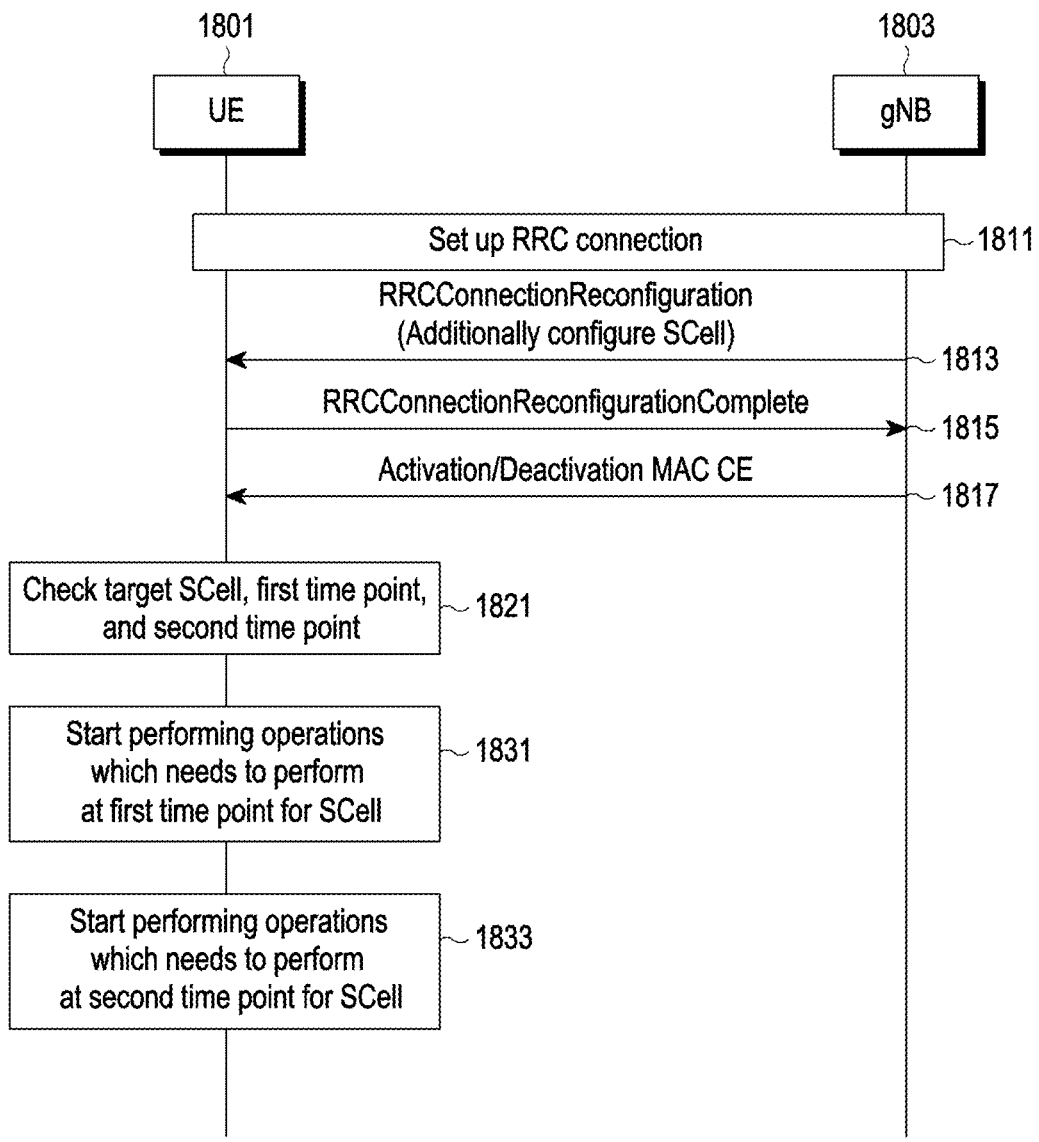
FIG. 18 is a diagram for describing transmission and reception of messages between a user equipment and a base station according to an embodiment of the present disclosure.
Figure 19:
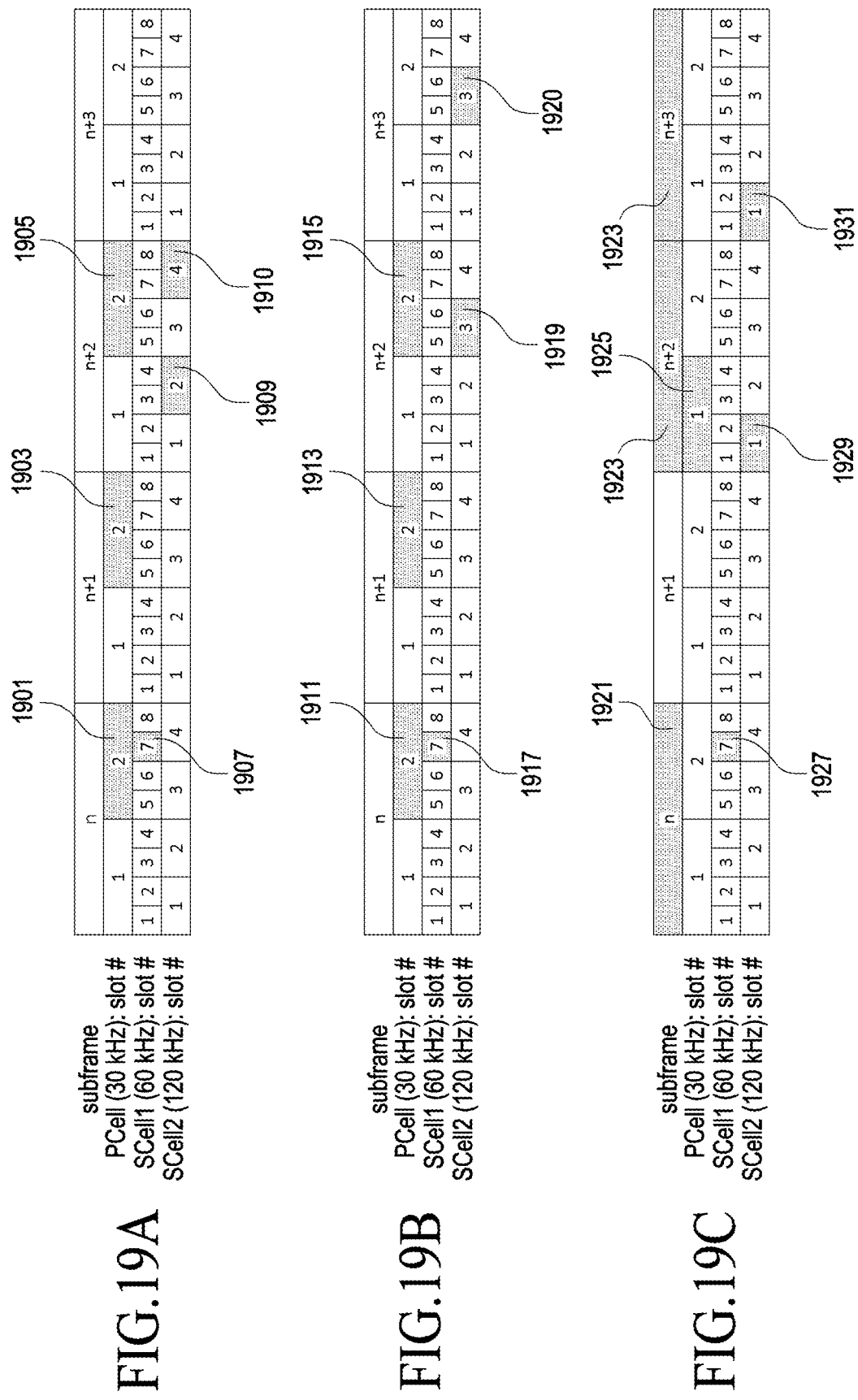
FIGS. 19A-19C are diagrams illustrating a time point at which an SCell is activated/inactivated according to an embodiment of the present disclosure.

FIG. 18 is a diagram for describing transmission and reception of messages between a user equipment and a base station according to an embodiment of the present disclosure.

In operation 1811, a user equipment 1801 in an idle mode RRC_IDLE accesses a base station for a reason such as a case where there is data to be transmitted, a case where a paging message is received indicating that data to be received exists, and/or the like. In the idle mode, the user equipment 1801 may not transmit data because the user equipment 1801 is not connected with a network for power saving, and/or the like, so there is a need for the user equipment 1801 to transition into a connected mode RRC_CONNECTED in order to transmit the data. If an access procedure to a base station 1803 is successful, a state of the user equipment 1801 is changed into the connected mode RRC_CONNECTED.

In operation 1813, the base station 1803 may additionally configure an SCell for a higher data transmission rate according to capability of a corresponding user equipment. This may be transmitted through a RRCConnectionReconfiguration message of an RRC layer. The message of the RRC layer may include an identifier of an activated SCell, related channel information, and/or the like.

In operation 1815, upon receiving the message, the user equipment 1801 transmits an acknowledgement message indicating that the message is successfully received. The acknowledgement message may be transmitted through an RRCConnectionReconfigurationComplete message of the RRC layer.

In operation 1813, the base station 1803 may notify the user equipment 1801 of which ones among configured SCells are activated/deactivated. This may be notified through an Activation/Deactivation MAC Control Element (CE). The Activation/Deactivation MAC CE is a MAC CE which consists of 8 bits and has a fixed size, and may consist of 7 C fields and one R field, or 31 C fields and one R field. An R field is a reserved field, and each of the 7 or 31 C fields may be expressed with an identifier i of a serving cell (a PCell or a SCell)(i.e., Ci). For an SCell i, each of the 7 or 31 C fields is marked as 1 to indicate activation or marked as 0 to indicate deactivation, so each of the 7 or 31 C fields is used for indicating whether each secondary carrier is activated. The user equipment 1801 may receive the Activation/Deactivation MAC CE through a PCell or an SCell which has been activated already. As described above, a numerology may be different between a PCell and an SCell or between SCells, so the number of slots may be different within 10 ms. For example, if an interval between secondary carriers is 15 kHz, 10 slots exist within 10 ms, however, if the interval is 60 kHz, 40 slots may exist within 10 ms. Even though the user equipment receives the MAC CE, there is a need for time to receive and process a corresponding message and to activate/deactivate a specific function according to this, so all operations may not be immediately activated or deactivated when the corresponding message is received, and there is a need for predetermined time by considering the time.

In operation 1821, the user equipment 1801 determines when the user equipment 1801 activates an operation to be performed upon activation/deactivation. In this case, the following three methods may be used.

Method 1: A user equipment starts and performs the first operation as a channel status report (e.g., CQI/PMI/RI/PTI/CRI) for a corresponding SCell based on numerology/slot length of a PCell (or a subframe); and starts (e.g., at the second time point), based on numerology/slot length of an SCell to be activated, the second operation as an operation of transmitting a sounding reference signal (SRS) to the corresponding SCell, monitoring a PDCCH of the corresponding SCell in the corresponding SCell, and starting sCellDeactivationTimer as a timer used for deactivating the corresponding SCell in a case that there is no operation on the corresponding SCell.

Method 2: Each of the first operation and the second operation in method 1 starts based on a predetermined number of PCell slots which is based on a slot of a PCell which corresponds to a time point at which reception of the Activation/Deactivation MAC Cell is completed.

Method 3: Both the first operation and the second operation in method 1 start based on a predetermined number of sub-frames which is based on a sub-frame boundary which corresponds to a time point at which reception of the Activation/Deactivation MAC Cell is completed.

In operations 1831 and 1833, the user equipment 1801 determines the first operations which the user equipment 1801 needs to perform at the first time point and the second operations which the user equipment 1801 needs to perform at the second time point according to each method to start corresponding operations at each time point for each method. Each method will be described with reference to FIGS. 19A-19C.

FIGS. 19A-19C are diagrams illustrating a time point at which an SCell is activated/inactivated according to an embodiment of the present disclosure.

Specially, FIG. 19A is a diagram illustrating an example of method 1 in FIG. 18, FIG. 19B is a diagram illustrating an example of method 2 in FIG. 18, and FIG. 19C is a diagram illustrating an example of method 3 in FIG. 18. In each of FIG. 19A, FIG. 19B, and FIG. 19C, a scenario will be assumed that SCell1 and SCell2 are additionally configured by a base station to a user equipment, the SCell1 has been already activated and the SCell2 will be activated. For convenience, the following constants will be defined.

C1: Delay constant for stating the operation 1 (i.e., a CSI report (e.g., a CQI/PMI/RI/PTI/CRI report)

C2: Delay constant for stating the operation 2 (i.e., SRS transmission/PDCCH monitoring) on a criterion 1 (here, the criterion 1 is a case that SCell to be activated has been already measured)

C3: Delay constant for stating the operation 2 (i.e., SRS transmission/PDCCH monitoring) on a criterion 1 (here, the criterion 1 is a case that SCell to be activated is not measured)

Meanwhile, C1, C2, and C3 may be configured to a user equipment through a message of an RRC layer, or may have a fixed value according to each method (for example, C1 indicates 8 slots of a PCell and C2 indicates 8 slots of an SCell to be activated, C1 indicates 8 subframes and C2 indicates 8 subframes, and/or the like).

In FIG. 19A, a user equipment receives, from a base station, an Activation/Deactivation MAC CE on the 7th slot 1907 of a sub-frame n on an SCell1. The 7th slot of the sub-frame n on the SCell1 corresponds to the 2nd slot 1901 of a sub-frame n on a PCell. In FIG. 19A, the 7th slot 1907 of the sub-frame n on the SCell will be referred to as a reference 1 slot.

For the Activation/Deactivation MAC CE received from the base station, if reception is successful, the user equipment transmits a HARQ ACK on the PCell. In FIG. 19A, this will be referred to as a reference 2 slot. The reference 2 slot corresponds to a reference sign 1903.

According to this, the operation 1, i.e., the channel status report will be started after the C1 slot time which is based on the PCell based on the reference 1 slot or the reference 2 slot (1905). A case that the reference 1 slot is used and C1=4 or a case that the reference 2 slot is used and C1=2 is illustrated in FIG. 19A.

Meanwhile, if there is no data to be transmitted during the predetermined time for an activated SCell2, a user equipment may deactivate SCell2, so the user equipment may drive an sCellDeactivationTimer. At this time, the sCellDeactivationTimer starts after the C2 slot time which is based on the SCell2 to be activated based on the reference 1 slot or the reference 2 slot (1909). A case that the reference 1 slot is used and C2=7 or a case that the reference 2 slot is used and C2=3 is illustrated in FIG. 19A.

In order to receive data on the activated SCell2, the user equipment needs to receive a PDCCH for the activated SCell2 or a PDCCH of the activated SCell2 to receive the data. The user equipment needs to monitor the PDCCH for receiving the data. At this time, a time point at which the monitoring is started is based on the reference 1 slot or the reference 2 slot, so the monitoring is started between the C2 slot time 1909 which is based on the SCell to be activated and the C3 slot time 1911 which is based on the SCell to be activated.

In FIG. 19B, a user equipment receives, from a base station, an Activation/Deactivation MAC CE on the 7th slot 1917 of a sub-frame n on an SCell1. The 7th slot of the sub-frame n on the SCell1 corresponds to the 2nd slot 1911 of a sub-frame n on a PCell. In FIG. 19B, this will be referred to as a reference 1 slot.

For the Activation/Deactivation MAC CE received from the base station, if reception is successful, the user equipment transmits a HARQ ACK on the PCell. In FIG. 19B, this will be referred to as a reference 2 slot. The reference 2 slot corresponds to a reference sign 1913.

According to this, the operation 1, i.e., the channel status report will be started after the C1 slot time which is based on the PCell based on the reference 1 slot or the reference 2 slot (1915). A case that the reference 1 slot is used and C1=4 or a case that the reference 2 slot is used and C1=2 is illustrated in FIG. 19B.

Meanwhile, if there is no data to be transmitted during predetermined time for an activated SCell2, a user equipment may deactivate the SCell2, so the user equipment may drive an sCellDeactivationTimer. At this time, the sCellDeactivationTimer starts after the C2 slot time which is based on a PCell based on the reference 1 slot or the reference 2 slot (1919). A case that the reference 1 slot is used and C2=4 or a case that the reference 2 slot is used and C2=2 is illustrated in FIG. 19B.

In order to receive data on the activated SCell2, the user equipment needs to receive a PDCCH for the activated SCell2 or a PDCCH of the activated SCell2 to receive the data. The user equipment needs to monitor the PDCCH for receiving the data. At this time, a time point at which the monitoring is started is based on the reference 1 slot or the reference 2 slot, so the monitoring is started between the C2 slot time 1919 which is based on the PCell and the C3 slot time 1921 which is based on the PCell.

In FIG. 19C, a user equipment receives, from a base station, an Activation/Deactivation MAC CE on the 7th slot 1927 of a sub-frame n on an SCell1. The 7th slot of the sub-frame n on the SCell1 corresponds to a sub-frame n 1921. In FIG. 19C, the 7th slot of the sub-frame n on the SCell1 will be referred to as a reference sub-frame.

According to this, the operation 1, i.e., the channel status report will be started after the C1 sub-frame time which is based on a sub-frame based on the reference sub-frame (1923). According to this, the operation 1 of a corresponding SCell is started on a slot 1925 of a PCell which corresponds to a sub-frame n+2.

Meanwhile, if there is no data to be transmitted during predetermined time for an activated SCell2, a user equipment may deactivate the SCell2, so the user equipment may drive an sCellDeactivationTimer. At this time, the sCellDeactivationTimer may start on a slot 1929 of a corresponding SCell which corresponds to time after the C2 sub-frames which is based on the sub-frame.

In order to receive data on the activated SCell2, the user equipment needs to receive a PDCCH for the activated SCell2 or a PDCCH of the activated SCell2 to receive the data. The user equipment needs to monitor the PDCCH for receiving the data. At this time, a time point at which the monitoring is started is based on the reference sub-frame, so the monitoring is started between the first slot 1929 of the activated SCell2 which corresponds to the C2 sub-frame time 1923 and the first slot 1931 of the activated SCell2 which corresponds to the C2 sub-frame time 1933.

Figure 20:
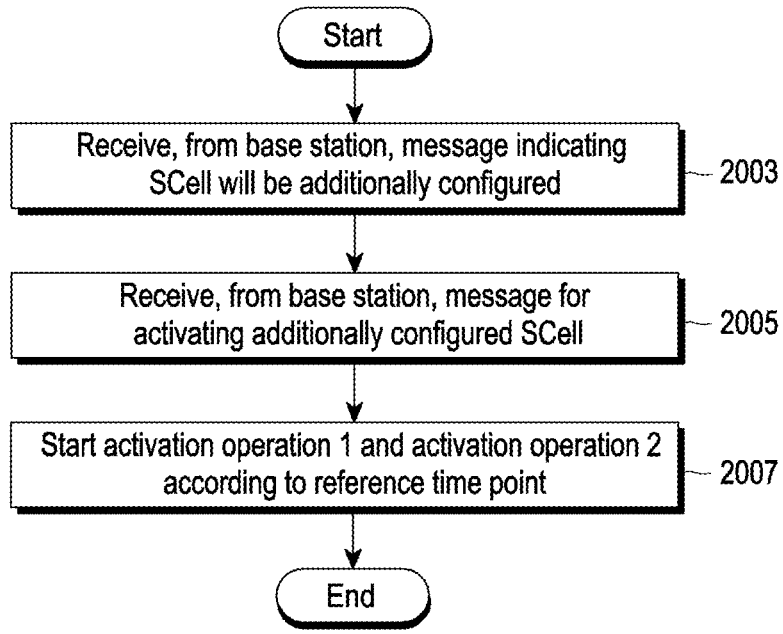
FIG. 20 is a diagram for describing a method in which a user equipment performs activation and deactivation according to an embodiment of the present disclosure.

FIG. 20 is a diagram for describing a method in which a user equipment performs activation and deactivation according to an embodiment of the present disclosure.

It will be assumed that a user equipment may be connected to a base station to transmit and receive data. Further, a case will be assumed that carrier aggregation is performed between cells which operate on a frequency of which a sub-frame length of a PCell is different from a sub-frame length of an SCell. According to this, an additional SCell may be configured by a base station to the user equipment for a higher data transmission speed.

In operation 2003, the user equipment receives, from the base station, a message indicating that an SCell will be additionally configured. The message may be transmitted through an RRCConnectionReconfiguration message of an RRC layer. The message of the RRC layer may include an identifier of an SCell to be activated, related channel information, and/or the like. Upon receiving the message, the user equipment transmits an acknowledgement message indicating that the message is successfully received, and this acknowledgement message may be transmitted using an RRCConnectionReconfigurationComplete message of the RRC layer.

In operation 2005, the user equipment may receive, from the base station, a message for activating (or deactivating) the additionally configured SCell. The message may be transmitted through an Activation/Deactivation MAC Control Element (CE). The Activation/Deactivation MAC CE may be received on a PCell or an SCell which has been already activated. As described above, a numerology may be different between a PCell and an SCell or between SCells, so the number of slots may be different within 10 ms. For example, if an interval between secondary carriers is 15 kHz, 10 slots exist within 10 ms, however, if the interval is 60 kHz, 40 slots may exist within 10 ms. Even though the user equipment receives the MAC CE, there is a need for time to receive and process a corresponding message and to activate/deactivate a specific function according to this, so all operations may not be immediately activated or deactivated when the corresponding message is received, and there is a need for predetermined time.

Method 1: A user equipment starts and performs the first operation as a channel status report (e.g., CQI/PMI/RI/PTI/CRI) for a corresponding SCell based on numerology/slot length of a PCell (or a subframe); and starts (e.g., at the second time point), based on numerology/slot length of an SCell to be activated, the second operation as an operation of transmitting a sounding reference signal (SRS) to the corresponding SCell, monitoring a PDCCH of the corresponding SCell in the corresponding SCell, and starting sCellDeactivationTimer as a timer used for deactivating the corresponding SCell in a case that there is no operation on the corresponding SCell.

Method 2: Each of the first operation and the second operation in method 1 starts based on a predetermined number of PCell slots which is based on a slot of a PCell which corresponds to a time point at which reception of the Activation/Deactivation MAC Cell is completed.

Method 3: Each of the first operation and the second operation in method 1 starts based on a predetermined number of sub-frames which is based on a sub-frame boundary which corresponds to a time point at which reception of the Activation/Deactivation MAC Cell is completed.

In operation 2007, the user equipment determines the first operations which the user equipment needs to perform at the first time point and the second operations which the user equipment needs to perform at the second time point according to each of the three methods. The user equipment starts corresponding operations.

Figure 21:
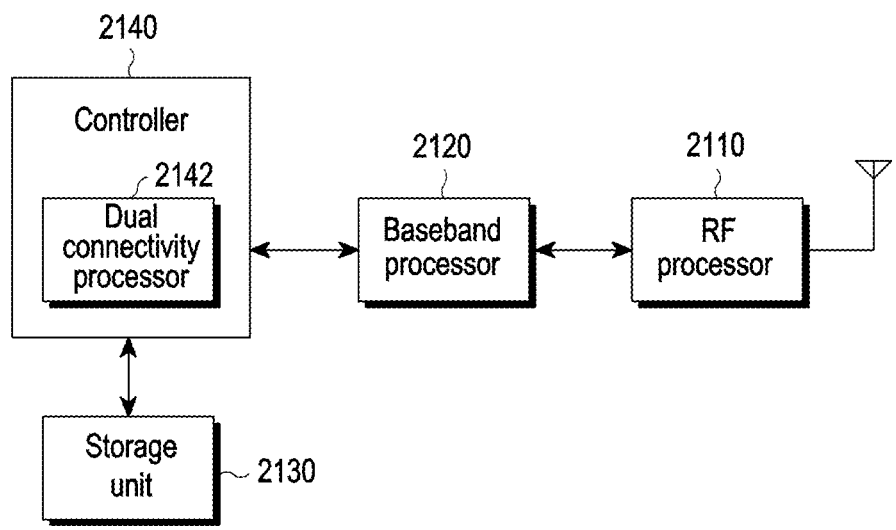
FIG. 21 is a diagram illustrating a structure of a user equipment in a wireless communication system according to an embodiment of the present disclosure.

FIG. 21 is a diagram illustrating a structure of a user equipment in a wireless communication system according to an embodiment of the present disclosure.

Referring to FIG. 21, a user equipment may include a Radio Frequency (RF) processor 2110, a baseband processor 2120, a storage unit 2130, and a controller 2140.

The RF processor 2110 may perform a function for transmitting and receiving a signal through a radio channel such as band conversion, amplification, and/or the like. That is, the RF processor 2110 may up-convert a baseband signal provided from the baseband processor 2120 into an RF band signal to transmit the RF band signal through an antenna, and down-convert an RF band signal received through the antenna into a baseband signal. For example, the RF processor 2110 may include a transmission filter, a reception filter, an amplifier, a mixer, an oscillator, a digital to analog convertor (DAC), an analog to digital convertor (ADC), and/or the like. Although one antenna is illustrated in FIG. 21, the user equipment may include a plurality of antennas. Further, the RF processor 2110 may include a plurality of RF chains. The RF processor 2110 may perform beamforming. For the beamforming, the RF processor 2110 may adjust a phase and a magnitude of each of signals transmitted and received through the plurality of antennas or antenna elements.

The baseband processor 2120 may perform a transformation function between a baseband signal and a bit stream according to a physical layer standard of a system. For example, the baseband processor 2120 may encode and modulate a transmission bit stream to generate complex symbols upon data transmission. The baseband processor 2120 may recover a reception bit stream by demodulating and decoding a baseband signal provided from the RF processor 2110 upon data reception. For example, in a case of following an orthogonal frequency division multiplexing (OFDM) scheme, upon data transmission, the baseband processor 2120 may encode and modulate a transmission bit stream to generate complex symbols, map the complex symbols to subcarriers, and generate OFDM symbols by an inverse fast Fourier transform (IFFT) operation and cyclic prefix (CP) insertion. Upon data reception, the baseband processor 2120 may divide a baseband signal provided from the RF processor 2110 on an OFDM symbol basis, recover signals mapped to subcarriers by a fast Fourier transform (FFT) operation, and recover a reception bit stream though demodulation and decoding.

As described above, the baseband processor 2120 and the RF processor 2110 transmit and receive a signal. According to this, the baseband processor 2120 and the RF processor 2110 may be referred to as a transmitter, a receiver, a transceiver, or a communication unit. At least one of the baseband processor 2120 and the RF processor 2110 may include a plurality of communication modules for supporting different radio access technologies. At least one of the baseband processor 2120 and the RF processor 2110 may include different communication modules for processing signals on different frequency bands. For example, the different radio access technologies may include wireless LAN (e.g., IEEE 802.11), a cellular network (e.g., LTE) and/or the like. The different frequency bands may include a super high frequency (SHF)(e.g., 2.5 GHz, and 5 Ghz) band and a millimeter wave (e.g., 60 GHz) band.

The storage 2130 may store a basic program for an operation of the user equipment, an application program, configuration information, and/or the like. Specially, the storage 2130 may store information related to a wireless LAN node which performs a wireless communication using a wireless LAN access technology. The storage 2130 may provide stored data according to request of the controller 2140.

The controller 2140 may control the overall operations of the user equipment. For example, the controller 2140 may transmit and receive a signal through the baseband processor 2120 and the RF processor 2110. The controller 2140 may record data into the storage 2130 and read data from the storage 2130. For this, the controller 2140 may include at least one processor. For example, the controller 2140 may include a communication processor (CP) which performs control for a communication and an application processor (AP) which controls an upper layer such as an application program, and/or the like. According to an embodiment of the present disclosure, the controller 2140 may include a dual connectivity processor 2142 to perform processing for an operation in a dual connectivity mode. For example, the controller 2140 may control the user equipment to perform a procedure in FIG. 21.

Figure 22:
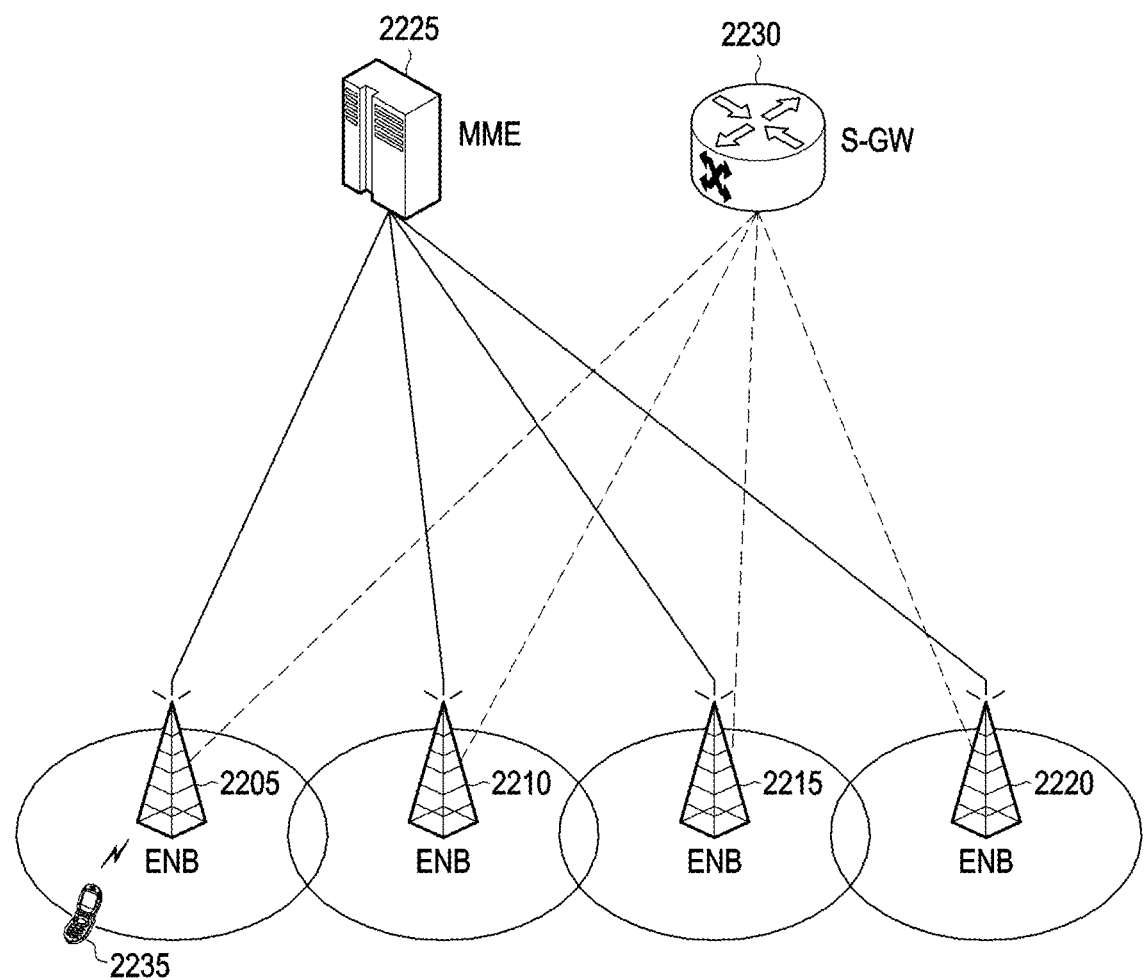
FIG. 22 is a diagram illustrating a structure of a wireless communication system according to an embodiment of the present disclosure.

Upon receiving, from the base station, an activation/deactivation command for a corresponding cell after receiving a command to add the corresponding cell of which a sub-frame length is different, the controller 2140 may determine a time point at which a given operation is activated/deactivated according to difference between a sub-frame length of a current PCell and a sub-frame length of an activated SCell to perform the given operation. FIG. 22 is a diagram illustrating a structure of a wireless communication system according to an embodiment of the present disclosure.

Referring to FIG. 22, a wireless communication system includes a plurality of base stations 2205, 2210, 2215, and 2220, a Mobility Management Entity (MME) 2225, and a Serving-Gateway (S-GW) 2230. A User Equipment (hereinafter, will be referred to as UE or terminal) 2235 accesses an external network through the base stations 2205, 2210, 2215, and 2220 and the S-GW 2230.

The base stations 2205, 2210, 2215, and 2220 are access nodes of a cellular network and provide a radio access to user equipments which access a network. That is, the base stations 2205, 2210, 2215, and 2220 collect status information such as buffer status, available transmission power status, channel status, and/or the like of the user equipments to perform scheduling and support a connection among the user equipments and a Core network (CN) in order to service users' traffic. The MME 2225 is an apparatus which is responsible for various control functions as well as a mobility management function for the user equipment 2235, and is connected to a plurality of base stations, and the S-GW 2230 is an apparatus which provides a data bearer. Further, the MME 2225 and the S-GW 2230 may perform authentication, bearer management, and/or the like for the user equipment 2235, and process a packet received from the base stations 2205, 2210, 2215, and 2220 and a packet to be transmitted to the base stations 2205, 2210, 2215, and 2220.

Figure 23:
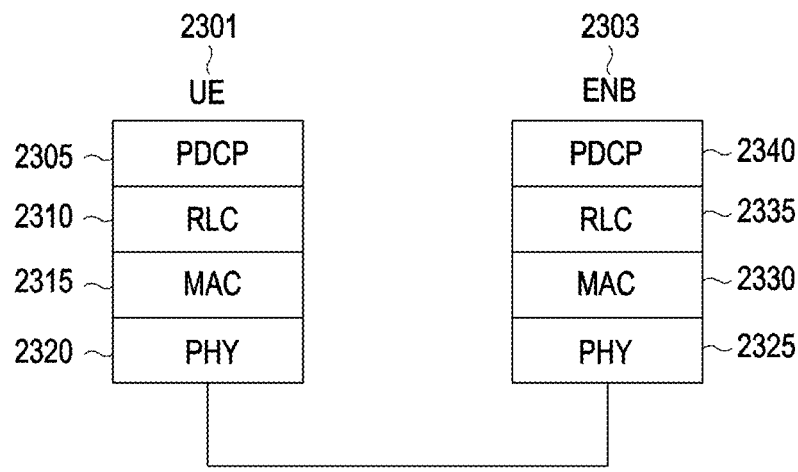
FIG. 23 is a diagram illustrating a frame structure of a wireless communication system according to an embodiment of the present disclosure.

FIG. 23 is a diagram illustrating a frame structure of a wireless communication system according to an embodiment of the present disclosure.

Referring to FIG. 23, a radio protocol of a wireless communication (e.g., an LTE) system may include Packet Data Convergence Protocols (PDCPs) 2305 and 2340, Radio Link Controls (RLCs) 2310 and 2335, and Medium Access Controls (MACs) 2315 and 2330 in a user equipment 2301 and an ENB 2303. The Packet Data Convergence Protocols (PDCPs) 2305 and 2340 are responsible for an operation such as IP header compression/recovery, and/or the like, and the Radio Link Controls (RLCs) 2310 and 2335 reconfigure a PDCP Packet Data Unit (PDU) with a suitable size. The MACs 2315 and 2330 are connected to a plurality of RLC layer apparatuses configured in one user equipment, and performs an operation for multiplexing RLC PDUs into a MAC PDU, and de-multiplexing a MAC PDU into RLC PDUs. Physical layers 2320 and 2325 perform an operation for channel encoding and modulating upper layer data to generate an OFDM symbol and transmit the OFDM symbol through a radio channel, or an operation for demodulating and channel decoding an OFDM symbol received through a radio channel to transfer the channel decoded signal to an upper layer. The physical layers 2320 and 2325 use a Hybrid ARQ (HARQ) for additional error correction, and a receiving end transmits 1 bit indicating whether a packet transmitted at a transmitting end is received. This will be referred to as HARQ ACK/NACK information. Downlink HARQ ACK/NACK information for uplink transmission may be transmitted through a Physical Hybrid-ARQ Indicator Channel (PHICH) physical channel, and uplink HARQ ACK/NACK information for downlink transmission may be transmitted through a Physical Uplink Control Channel (PUCCH) or Physical Uplink Shared Channel (PUSCH) physical channel. The PUCCH is generally transmitted on a uplink of a PCell to be described below, however, there is a case that a user equipment additionally transmits a PUCCH if the user equipment supports the additional transmission of the PUCCH, this will be referred to as PUCCH SCell.

Although not shown in FIG. 23, a Radio Resource Control (RRC) layer exists on an upper layer of a PDCP layer of each of a user equipment and a base station, and the RRC layer may transmit and receive a configuration control message related to an access and measurement for radio resource control.

Meanwhile, the PHY layers 420 and 425 may consist of one or a plurality of frequencies/carriers, and a technology for configuring the plurality of frequencies at the same time and using them will be referred to as a carrier aggregation (CA) technology. At this time, the CA technology may significantly increase transmission amount by the number of secondary carriers by using a primary carrier and one or a plurality of secondary carriers for communication between a terminal (or a User Equipment, or a UE) and a base station (an E-UTRAN NodeB, or an eNB) instead of using one carrier for the communication between the terminal and the base station. In an LTE, a cell within a base station which uses a primary carrier is referred to as a Primary Cell (PCell), and a secondary carrier is referred to as a Secondary Cell (SCell).

Meanwhile, in an LTE system, a user equipment reports power headroom information (e.g., a PHR Power Headroom Report (PHR)) to a base station according to a predetermined criterion. The power headroom information denotes difference between maximum transmission power configured to the user equipment and transmission power estimated by the user equipment. The transmission power estimated by the user equipment is calculated based on a value used upon transmission in a case that the user equipment actually transmits an uplink (a value calculated at this time will be referred to as a real value), however, the transmission power estimated by the user equipment is calculated based on a predetermined equation defined in a standard specification in a case that the user equipment does not actually transmit the uplink (a value calculated at this time will be referred to as a virtual value). The base station may identify a maximum transmittable power value of the user equipment according to the report of the power headroom information. Meanwhile, in the CA situation, the power headroom information is transmitted per secondary carrier.

Figure 24:
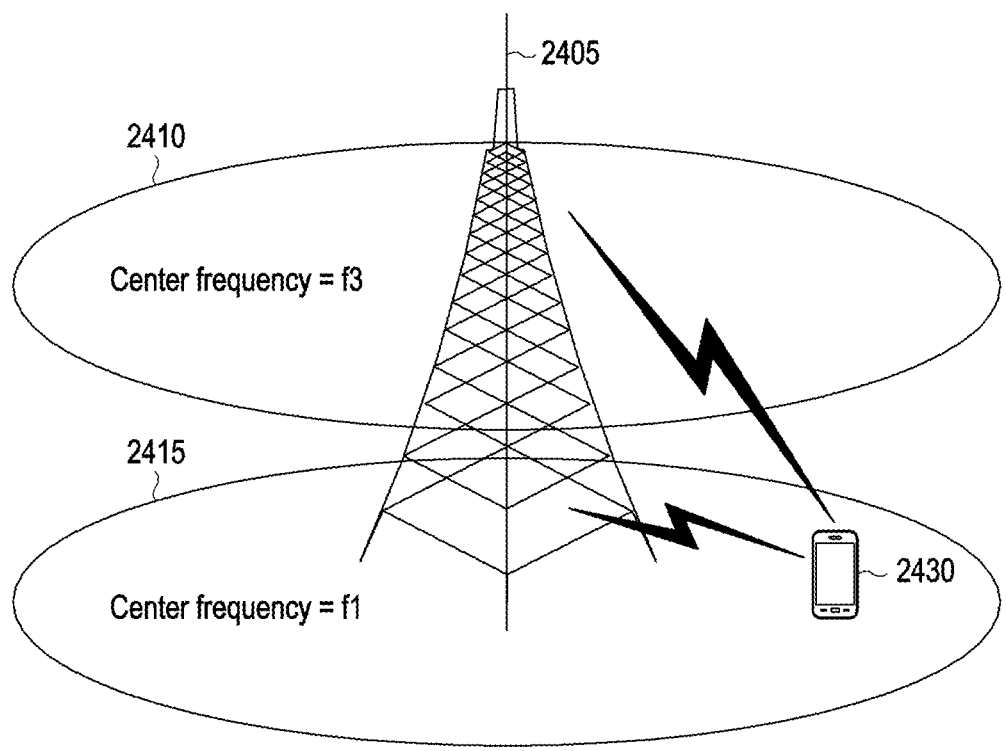
FIG. 24 is a diagram for describing a carrier aggregation technology in a user equipment according to an embodiment of the present disclosure.

FIG. 24 is a diagram for describing a carrier aggregation technology in a user equipment according to an embodiment of the present disclosure.

Referring to FIG. 24, generally, multiple carriers are transmitted and received across a plurality of frequency bands in one base station 2405. For example, when a base station 2405 transmits a carrier 2415 with a center frequency f1 and a carrier 2410 with a center frequency f3, a user equipment which has no carrier aggregation capability transmits and receives data using one of the two carriers. However, a user equipment which has carrier aggregation capability may transmit and receive data using a plurality of carriers at the same time. The base station 2405 may increase a transmission speed of a user equipment 2430 by allocating more carriers to the user equipment 2430 which has carrier aggregation capability according to a situation.

When one downlink carrier and one uplink carrier which are transmitted and received in a base station configure one cell, it will be understood that carrier aggregation means that a user equipment transmits and receives data through a plurality of cells at the same time. A maximum transmission speed increases in proportional to the number of carriers which are aggregated based on this.

Hereinafter, in explaining the present disclosure, a case that a user equipment receives data through an arbitrary downlink carrier or transmits data through an arbitrary uplink carrier means a case that the user equipment transmits and receives data using a control channel and a data channel provided by a cell which corresponds to a center frequency and a frequency band which specifies the carrier. Hereinafter, an embodiment of the present disclosure will assume an LTE system for convenience, however, the present disclosure may be applied to various wireless communication systems which support carrier aggregation.

In a case that carrier aggregation is performed or a case that the carrier aggregation is not performed, uplink transmission (i.e., transmission from a user equipment to a base station) causes interference in an uplink of another cell, so uplink transmission output needs to be maintained at an appropriate level. For this, for performing uplink transmission, the user equipment calculates uplink transmission output using a predetermined function, and performs the uplink transmission based on the calculated uplink transmission output. For example, the user equipment inputs, into the predetermined function, input values which may estimate a channel situation such as scheduling information such as amount of allocated transmission resources, a Modulation Coding Scheme (MCS) level to be applied, and/or the like, a path loss value, and/or the like to calculate a required uplink transmission output value, and performs uplink transmission by applying the required uplink transmission output value. An uplink transmission output value which a user equipment may apply is limited according to a maximum transmission value of the user equipment. If the required uplink transmission output value is greater than the maximum transmission value of the user equipment, the user equipment performs uplink transmission by applying the maximum transmission value. In this case, it is impossible to apply sufficient uplink transmission output, so degradation of uplink transmission quality may occur. It is preferable that the base station performs scheduling such that required transmission output is not greater than maximum transmission output. However, the base station may not identify some parameters such as path loss, and/or the like, so the user equipment reports, to the base station, available transmission power (e.g., power headroom (PH)) status of the user equipment by transmitting a Power Headroom Report (PHR) message if necessary.

Parameters which affect available transmission power include 1) amount of allocated transmission resources, 2) an MCS to be applied for uplink transmission, 3) path loss of a related downlink carrier, 4) an accumulated value of commands for adjusting output, and/or the like. The path loss (PL) or the accumulated-output adjustment command value among these may be different for each uplink carrier, so, if a plurality of uplink carriers are aggregated for one user equipment, it is right to configure whether to transmit a PHR for each uplink carrier. However, for effective PHR transmission, all PHs for a plurality of uplink carriers may be reported on one uplink carrier. According to an operation strategy, there may be a need for a PH for a carrier on which actual PUSCH transmission does not occur. In this case, it is more effective to report all PHs for a plurality of uplink carriers on one uplink carrier. For this, an existing PHR needs to be extended. A plurality of PHs to be included in one PHR may be configured according to a predetermined order.

Generally, a PHR is triggered if path loss of a connected uplink carrier is varied by a value which is greater than or equal to a predetermined reference value, if a prohibit PHR timer expires, or if a predetermined duration elapses after the PHR is generated. Even though the PHR is triggered, a user equipment does not immediately transmit the PHR, and waits until a time point at which uplink transmission is possible, e.g., a time point at which an uplink transmission resource is allocated. This is why the PHR is not information that needs to be processed very quickly.

Figure 25:
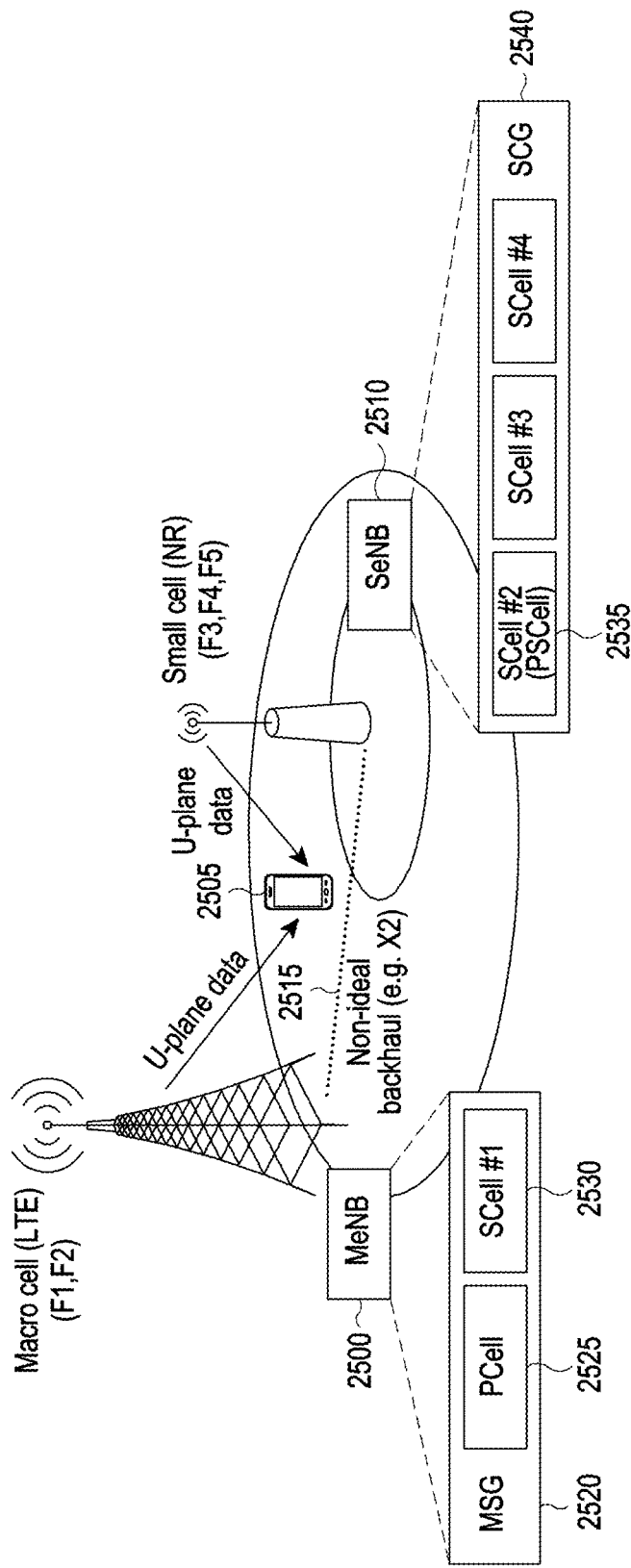
FIG. 25 is a diagram illustrating a dual connectivity (DC) in an LTE and an NR according to an according to an embodiment of the present disclosure.

FIG. 25 is a diagram illustrating a dual connectivity (DC) in an LTE and an NR according to an according to an embodiment of the present disclosure.

Upon using a Dual connectivity (DC) technology, a user equipment may connect with two base stations at the same time and use the two base stations at the same time. A case that a user equipment 2505 connects with a macro base station 2500 which uses an LTE technology and a small cell base station 2510 which uses an NR technology at the same time to transmit and receive data with the macro base station 2500 and the small cell base station 2510 is illustrated in FIG. 25. This will be referred to as E-UTRAN-NR Dual Connectivity (EN-DC). A macro base station will be referred to as a Master E-UTRAN NodeB (MeNB), and a small cell base station will be referred to as a Secondary 5G NodeB (SgNB). There may be a plurality of small cells within a service area of the MeNB 2500, and the MeNB 2500 connects with the SgNB 2510 through a wire backhaul network 2515. A set of serving cells provided from the MeNB 2500 will be referred to as a Master Cell Group (MCG) 2520, and one serving cell in the MCG 2520 is necessarily a primary Cell (PCell) 2525 with all functions which an existing cell has performed, such as connection establishment, connection re-establishment, handover, and/or the like. In the PCell, a uplink control channel includes a PUCCH. A serving cell except for the PCell will be referred to as a Secondary Cell (SCell) 2530. A scenario in which the MeNB 2500 provides one SCell and the SgNB 2510 provides 3 SCells is illustrated in FIG. 25. A set of serving cells provided from the SgNB 2510 will be referred to as a Secondary Cell Group (SCG) 2540. When the user equipment transmits and receives data with the two base stations, the MeNB 2500 commands the SgNB 2510 to add, change, and delete serving cells provided from the SgNB 2510. For this command, the MeNB 2500 may configure the user equipment to measure a serving cell and neighbor cells. The user equipment needs to report a measurement result to the MeNB 2500 according to configuration information. In order for the SgNB to effectively transmit and receive data with the user equipment, there is a need for a serving cell which performs a role similar to the PCell of the MCG 2520, and this will be referred to as a Primary SCell (PSCell) in the present disclosure. One of the serving cells of the SCG 2540 is determined as the PSCell, and the PSCell has a PUCCH as an uplink control channel. The PUCCH is used for the user equipment to transmit, to the base station, HARQ ACK/NACK information, Channel Status Information (CSI) information, Scheduling Request (SR), and/or the like.

Figure 26:
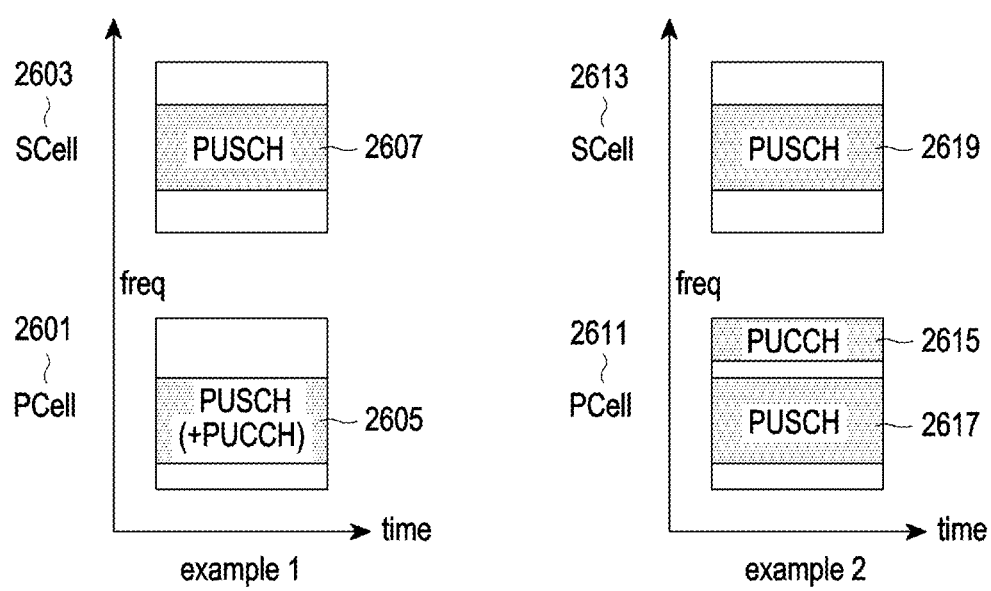
FIG. 26 is a diagram for describing an uplink transmitting method according to configuration and an uplink type according to an embodiment of the present disclosure.

FIG. 26 is a diagram for describing an uplink transmitting method according to configuration and an uplink type according to an embodiment of the present disclosure. An example 1 in FIG. 26 is a diagram illustrating a scenario in which two serving cells, i.e., a PCell 2601 and an SCell 2603 are configured to a user equipment and the user equipment performs uplink transmission according to scheduling of a base station. In the scenario, the user equipment may not transmit a PUCCH and a PUSCH as described above at the same time in one serving cell due to limitations of a transmission method and limitations of an RF structure. So, the user equipment embeds PUCCH information in a PUSCH to transmit the PUSCH (2605). At this time, the PUCCH information is transmitted in a PCell, or the PUCCH information is transmitted in an SCell of which an index is small among SCells if there is no PUSCH transmitted in the PCell. A PHR message as described above is transmitted as a part of the PUSCH, so, in the scenario, there is a need for the use equipment to report a power headroom value which is generated by subtracting transmission power consumed for PUSCH transmission 2605 and 2607 from maximum transmission power per serving cell $P_{CMAX,c}$. This will be referred to as Type 1 power headroom.

An example 2 in FIG. 26 is a diagram illustrating a scenario in which two serving cells, i.e., a PCell 2611 and an SCell 2613 are configured to a user equipment and the user equipment performs uplink transmission according to scheduling of a base station. In the scenario, the user equipment has capability to transmit a PUCCH and a PUSCH at the same time in one serving cell, or individually transmit the PUCCH and the PUSCH using an uplink transmission technology in which simultaneous transmission is possible as described above. At this time, in a case of a PCell (or an SCell in a case that a PUCCH may be transmitted in the SCell), there is a need for the user equipment to report a power headroom value which is generated by subtracting transmission power consumed for PUCCH transmission 2615 as well as transmission power consumed for PUSCH transmission 2617 from maximum transmission power of the PCell $P_{CMAX,c}$ by considering the transmission power consumed for PUSCH transmission 2617 and the transmission power consumed for PUCCH transmission 2615. This will be referred to as Type 2 power headroom.

Figure 27:
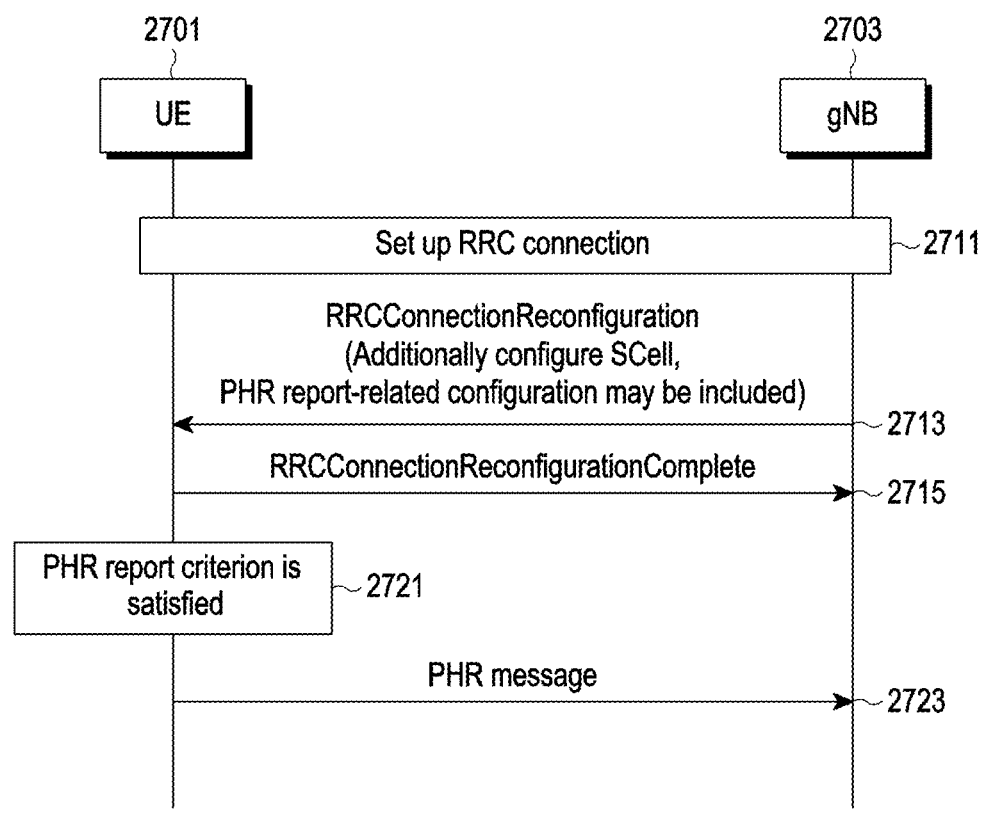
FIG. 27 is a diagram for describing transmission and reception of messages between a user equipment and a base station according to an embodiment of the present disclosure.

FIG. 27 is a diagram for describing transmission and reception of messages between a user equipment and a base station according to an embodiment of the present disclosure.

In operation 2711, a user equipment 2701 in an idle mode RRC_IDLE accesses a base station for a reason such as a case where there is data to be transmitted, a case where a paging message is received indicating that data to be received exists, and/or the like. In the idle mode, the user equipment 2701 may not transmit data because the user equipment 2701 is not connected with a network for power saving, and/or the like, so there is a need for the user equipment 2701 to transition into a connected mode RRC_CONNECTED in order to transmit the data. If an access procedure to a base station 2703 is successful, a state of the user equipment 2701 is changed into the connected mode RRC_CONNECTED.

In operation 2713, the base station 2703 may additionally configure an SCell for a higher data transmission rate according to capability of a corresponding user equipment. The base station 2703 may configure the user equipment 2701 to transmit a PUCCH in an additional SCell if the user equipment 2701 supports transmission of the PUCCH in the additional SCell. The base station 2703 may configure parameters used for reporting a PHR. Parameters related to the PHR include periodicPHR-Timer, prohibitPHR-Timer, dl-PathlossChange, and/or the like. The periodicPHR-Timer is a timer configured to periodically report a PHR value to the base station 2703, the prohibitPHR-Timer is a timer configured to prevent frequent PHR reports, and a value of the dl-PathlossChange is a threshold value which makes the user equipment 2701 to report a PHR if an instant change of a downlink channel is greater than or equal to the dl-PathlossChange value. The base station 2703 may additionally include, into the parameters related to the PHR, an indicator 1 indicating a Type 2 PH report of a PCell, an indicator 2 indicating a Type 2 PH report of a PUCCH SCell in a case that the PUCCH SCell is additionally configured, and an indicator 3 indicating a Type 2 PH report of a PSCell of DC in a case that the DC is used. The user equipment 2701 may determine whether to report Type 2 PH of a corresponding cell (e.g., PCell, PUCCH SCell, PSCell) according to whether the indicator is included.

For example, the base station 2703 may include the indicator 1 into the parameters related to the PHR to configure the user equipment 2701 to report Type 2 PH for a PCell if the base station 2703 configures a normal CA. For another example, the base station 2703 may include the indicator 1 and the indicator 2 into the parameters related to the PHR to configure the user equipment 2701 to report Type 2 PH for a corresponding PUCCH SCell if the base station 2703 configures CA and configures the user equipment 2701 to transmit a PUCCH on a specific SCell. In a case of configuring DC between an NR and an NR, the base station 2703 may configure the indicator 1 and the indicator 3 to the user equipment 2701 when configuring a PH report for an MCG such that the user equipment 2701 reports Type 2 PH for a PCell and a PSCell. The base station 2703 may configure the indicator 1 and the indicator 3 to the user equipment 2701 when configuring a PH report for an SCG such that the user equipment 2701 reports Type 2 PH for a PCell and a PSCell. In a case of configuring DC between an LTE and an NR (i.e., in a case of EN-DC), there may be no need for the base station 2703 to indicate a PH report for an LTE MCG. However, the base station 2703 may configure the indicator 1 and the indicator 3 to the user equipment 2701 when configuring a PH report for an NR SCG such that the user equipment 2701 reports Type 2 PH for a PCell and a PSCell. The configuration information may be transmitted using an RRCConnectionReconfiguration message of an RRC layer.

In operation 2715, upon receiving the message, the user equipment 2701 transmits an acknowledgement message indicating that the message is successfully received, and the acknowledgement message may be transmitted using an RRCConnectionReconfigurationComplete message of the RRC layer.

Meanwhile, criteria for when the PHR will be transmitted to the base station (i.e., when a report will be triggered) include the following criteria.

Case where a change in downlink received strength is greater than or equal to dl-PathlossChange dB when a prohibitPHR-Timer expires Case where a periodicPHR-Timer expires Case where a PHR report is initially configured Case where an SCell in which an uplink is included is added Case where a primary cell (e.g., PSCell) of a secondary base station is added when a dual connectivity technology is used If the PHR triggering criterion occurs, the user equipment 2701 generates a PHR to report the PHR to the base station 2703 in operation 2721. At this time, the user equipment 2701 determines whether to report Type 2 PH of a corresponding cell according to whether the indicator 1, the indicator 2, and the indicator 3 are included, and transmits a message which includes the Type 2 PH or a message which does not include the Type 2 PH. Even though the indicator is not included, for example, in a case where EN-DC is configured to the user equipment 2701 and it is configured for the user equipment 2701 to perform uplink transmission through all of two CGs, the user equipment 2701 may transmit, to the base station, Type 1 PH for all of two CGs (or, the base station may transmit an indicator indicating whether Type 1 PH is included, so the user equipment may determine whether to transmit the Type 1 PH according to this). Even though the indicator is not included, for example, in a case where EN-DC is configured to the user equipment 2701 and it is configured for the user equipment 2701 to perform uplink transmission through one CG (e.g., an MCG), the user equipment 2701 may transmit Type 1 PH to the base station 2703 through only a CG on which transmission is configured (or, the base station may transmit an indicator indicating whether Type 1 PH is included, so the user equipment may determine whether to transmit the Type 1 PH according to this).

The PHR is reported to the base station 2703, so the base station 2703 may determine current available power of the user equipment 2701 to schedule the user equipment 2701 according to this.

Figure 28:
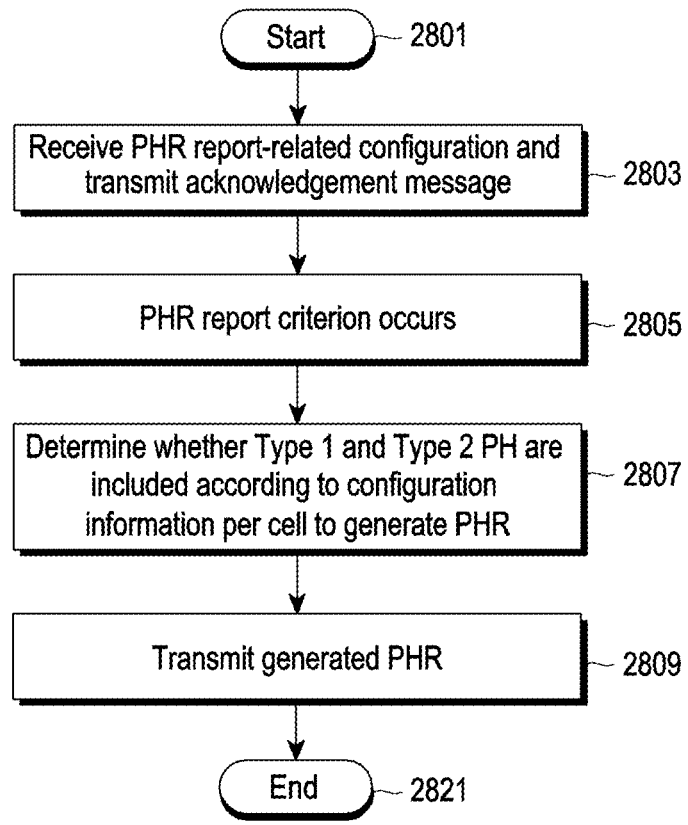
FIG. 28 is a flowchart for describing a method for transmitting a PHR in a user equipment according to an embodiment of the present disclosure.

FIG. 28 is a flowchart for describing a method for transmitting a PHR in a user equipment according to an embodiment of the present disclosure. It will be assumed that a user equipment has been already connected with a base station, so the user equipment may perform data transmission/reception. Thereafter, an SCell may be additionally configured by the base station to the user equipment, and the user equipment may be configured to transmit a PUCCH to the added SCell if this is supported by the user equipment.

In operation 2803, a parameter used for reporting a PHR may be configured by the base station to a user equipment. Parameters related to the PHR include periodicPHR-Timer, prohibitPHR-Timer, dl-PathlossChange, and/or the like. The periodicPHR-Timer is a timer configured to periodically report a PHR value to the base station, the prohibitPHR-Timer is a timer configured to prevent frequent PHR reports, and a dl-PathlossChange value is a threshold value which makes the user equipment to report a PHR if an instant change of a downlink channel is greater than or equal to the value. The base station may additionally include, into the parameters related to the PHR report, an indicator 1 indicating a Type 2 PH report of a PCell, an indicator 2 indicating a Type 2 PH report of a PUCCH SCell in a case that the PUCCH SCell is additionally configured, and an indicator 3 indicating a Type 2 PH report of a PSCell of DC in a case that the DC is used. The user equipment may determine whether to report Type 2 PH of a corresponding cell (e.g., PCell, PUCCH SCell, PSCell) according to whether the indicator is included.

For example, the base station may include the indicator 1 into the parameters related to the PHR to configure the user equipment to report Type 2 PH for a PCell if the base station configures a normal CA. For another example, the base station may include the indicator 1 and the indicator 2 into the parameters related to the PHR to configure the user equipment to report Type 2 PH for a corresponding PUCCH SCell if the base station configures CA and configures the user equipment to transmit a PUCCH on a specific SCell. In a case of configuring DC between an NR and an NR, the base station may configure the indicator 1 and the indicator 3 to the user equipment when configuring a PH report for an MCG such that the user equipment reports Type 2 PH for a PCell and a PSCell. The base station may configure the indicator 1 and the indicator 3 to the user equipment when configuring a PH report for an SCG such that the user equipment reports Type 2 PH for a PCell and a PSCell. In a case of configuring DC between an LTE and an NR (i.e., in a case of EN-DC), there is no need for the base station to indicate a PH report for an LTE MCG. However, the base station may configure the indicator 1 and the indicator 3 to the user equipment when configuring a PH report for an NR SCG such that the user equipment reports Type 2 PH for an PCell and a PSCell. The configuration information may be transmitted using an RRCConnectionReconfiguration message of an RRC layer.

In operation 2803, upon receiving the message, the user equipment transmits an acknowledgement message indicating that the message is successfully received. The acknowledgement message may be transmitted using an RRCConnectionReconfigurationComplete message of the RRC layer.

Meanwhile, criteria for when the PHR will be transmitted to the base station (i.e., when a report will be triggered) include the following criteria.

Case where a change in downlink received strength is greater than or equal to dl-PathlossChange dB when a prohibitPHR-Timer expires Case where a periodicPHR-Timer expires Case where a PHR report is initially configured Case where an SCell in which an uplink is included is added Case where a primary cell (e.g., PSCell) of a secondary base station is added when a dual connectivity technology is used If the PHR triggering criterion occurs in operation 2805, the user equipment generates a PHR in operation 2807. The user equipment reports the generated PHR to the base station in operation 2809. At this time, the user equipment determines whether to report Type 2 PH of a corresponding cell according to whether the indicator 1, the indicator 2, and the indicator 3 are included, and transmits a message which includes the Type 2 PH or a message which does not include the Type 2 PH. Even though the indicator is not included, for example, in a case that EN-DC is configured to the user equipment and it is configured for the user equipment to perform uplink transmission through all of two CGs, the user equipment may transmit Type 1 PH to the base station for all of two CGs (or, the base station may transmit an indicator indicating whether Type 1 PH is included, so the user equipment may determine whether to transmit the Type 1 PH according to this). Even though the indicator is not included, for example, in a case that EN-DC is configured to the user equipment and it is configured for the user equipment to perform uplink transmission through one CG (e.g., an MCG), the user equipment may transmit Type 1 PH to the base station through only a CG on which transmission is configured (or, the base station may transmit an indicator indicating whether Type 1 PH is included, so the user equipment may determine whether to transmit the Type 1 PH according to this).

The user equipment may provide information by reporting the PHR to the base station such that the base station may determine current available power of the user equipment to schedule the user equipment according to this.

Figure 29:
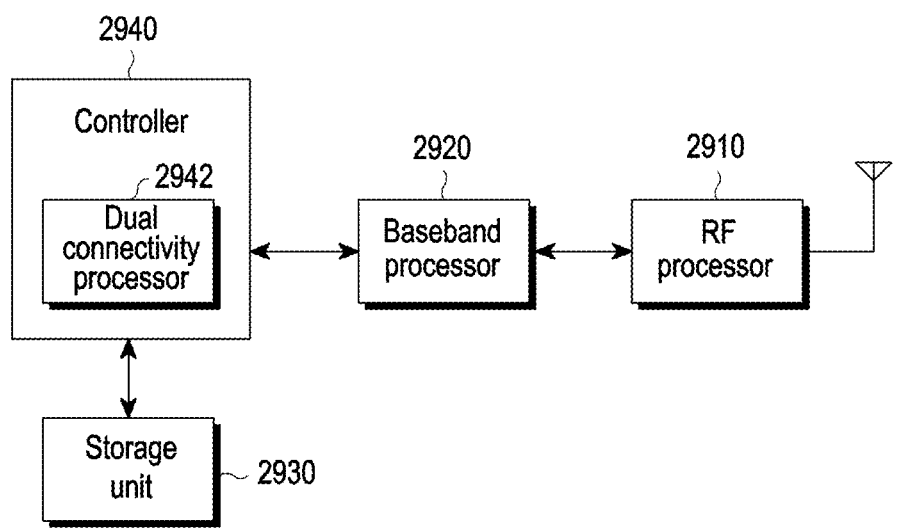
FIG. 29 is a diagram illustrating a structure of a user equipment in a wireless communication system according to an embodiment of the present disclosure.

FIG. 29 is a diagram illustrating a structure of a user equipment in a wireless communication system according to an embodiment of the present disclosure.

Referring to FIG. 29, a user equipment may include a Radio Frequency (RF) processor 2910, a baseband processor 2920, a storage 2930, and a controller 2940.

The RF processor 2910 may perform a function for transmitting and receiving a signal through a radio channel such as band conversion, amplification, and/or the like. That is, the RF processor 2910 may up-convert a baseband signal provided from the baseband processor 2920 into an RF band signal to transmit the RF band signal through an antenna, and down-convert an RF band signal received through the antenna into a baseband signal. For example, the RF processor 2910 may include a transmission filter, a reception filter, an amplifier, a mixer, an oscillator, a digital to analog convertor (DAC), an analog to digital convertor (ADC), and/or the like. Although one antenna is illustrated in FIG. 29, the user equipment may include a plurality of antennas. Further, the RF processor 2910 may include a plurality of RF chains. The RF processor 2910 may perform beamforming. For the beamforming, the RF processor 2910 may adjust a phase and a magnitude of each of the signals transmitted and received through the plurality of antennas or antenna elements.

The baseband processor 2920 may perform a transformation function between a baseband signal and a bit stream according to a physical layer standard of a system. For example, the baseband processor 2920 may encode and modulate a transmission bit stream to generate complex symbols upon data transmission. The baseband processor 2920 may recover a reception bit stream by demodulating and decoding a baseband signal provided from the RF processor 2910 upon data reception. For example, in a case of following an orthogonal frequency division multiplexing (OFDM) scheme, upon data transmission, the baseband processor 2920 may encode and modulate a transmission bit stream to generate complex symbols, map the complex symbols to subcarriers, and generate OFDM symbols by an inverse fast Fourier transform (IFFT) operation and cyclic prefix (CP) insertion. Upon data reception, the baseband processor 2920 may divide a baseband signal provided from the RF processor 2910 on an OFDM symbol basis, recover signals mapped to subcarriers by a fast Fourier transform (FFT) operation, and recover a reception bit stream though demodulation and decoding.

As described above, the baseband processor 2920 and the RF processor 2910 may transmit and receive a signal. According to this, the baseband processor 2920 and the RF processor 2910 may be referred to as a transmitter, a receiver, a transceiver, or a communication unit. At least one of the baseband processor 2920 and the RF processor 2910 may include a plurality of communication modules for supporting different radio access technologies. At least one of the baseband processor 2920 and the RF processor 2910 may include different communication modules for processing signals on different frequency bands. For example, the different radio access technologies may include wireless LAN (e.g., IEEE 802.11), a cellular network (e.g., LTE) and/or the like. The different frequency bands may include a super high frequency (SHF)(e.g., 2.5 GHz and 5 Ghz) band, and a millimeter wave (e.g., 60 GHz) band.

The storage 2930 may store a basic program for an operation of the user equipment, an application program, configuration information, and/or the like. Specially, the storage 2930 may store information related to a wireless LAN node which performs a wireless communication using a wireless LAN access technology. The storage 2930 may provide stored data according to request of the controller 2940.

The controller 2940 may control the overall operations of the user equipment. For example, the controller 2940 may transmit and receive a signal through the baseband processor 2920 and the RF processor 2910. The controller 2940 may record data into the storage 2930 and read data from the storage 2930. For this, the controller 2940 may include at least one processor. For example, the controller 2940 may include a communication processor (CP) which performs control for a communication and an application processor (AP) which controls a upper layer such as an application program, and/or the like. According to an embodiment of the present disclosure, the controller 2940 may include a dual connectivity processor 2942 to perform processing for an operation in a dual connectivity mode. For example, the controller 2940 may control the user equipment to perform a procedure in FIG. 29.

The controller 2940 according to an embodiment of the present disclosure may identify a power headroom type to be reported per serving cell according to configuration information received from the base station, obtain this from a physical layer, and transmit a message for transmitting corresponding information to the base station.

Method according to embodiments described in the specification of the present disclosure may be implemented in a form of hardware, software, or a combination of hardware and software.

If the methods are implemented in the form of the software, a computer readable storage medium which stores one or more programs (or software modules) may be provided. The one or more programs stored in the computer readable storage medium are configured such that one or more processors within an electronic device may execute the one or more programs. The one or more programs include instructions which cause the electronic device to execute methods according to embodiments described in the claims and/or the specification of the present disclosure.

These programs (software modules and software) may be stored in a non-volatile memory including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or an optical storage device with other form, and a magnetic cassette. Alternatively, these programs may be stored in a memory which consists of a combination of a part or all of these. Further, a plurality of component memories may be included.

The programs may be stored at an attachable storage device which may be accessed through a communication network such as an internet, an intranet, a Local Area Network (LAN), a Wide LAN (Wide LAN), or a Storage Area Network (SAN), or a communication network which consists of a combination of these. This storage device may access a device which performs an embodiment of the present disclosure through an external port. Further, an additional device on a communication network may access a device which performs an embodiment of the present disclosure.

In specific embodiments of the present disclosure, a component included in the present disclosure is expressed in a singular form or a plural form according to a proposed specific embodiment. However, the singular form or the plural form is suitable because the form was selected according to a situation proposed for convenience, so the present disclosure is not limited to a single component or a plurality of components, and the components which have been expressed in the plural form may be expressed in the singular form or a component which has been expressed in the singular form may be expressed in the plural form.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for reporting power headroom by a user equipment (UE) operating with a first base station and a second base station in a wireless communication system, comprising:

obtaining configuration information for configuring a secondary cell group (SCG) associated with the second base station, generated from the second base station;

identifying whether the configuration information includes an indication indicating to report a second type power headroom (PH) for a primary cell associated with the first base station; and in case that the configuration information includes the indication, transmitting, to the second base station, a power headroom report (PHR) including the second type PH for the primary cell associated with the first base station.

2. The method of claim 1, wherein the configuration information is included in a radio resource control (RRC) reconfiguration information for the second base station.

3. The method of claim 1, wherein the PHR is triggered based on a set criterion.

4. The method of claim 1, wherein the first base station operates according to a first radio access technology (RAT) and the second base station operates according to a second RAT.

5. The method of claim 4, wherein the first RAT includes long term evolution (LTE) and the second RAT includes new radio (NR).

6. A user equipment (UE) operating with a first base station and a second base station for reporting power headroom in a wireless communication system, comprising:

a transceiver; and at least one processor coupled with the transceiver and configured to control to:

obtain configuration information for configuring a secondary cell group (SCG) associated with the second base station, generated from the second base station, identify whether the configuration information includes an indication indicating to report a second type power headroom (PH) for a primary cell associated with the first base station, and in case that the configuration information includes the indication, transmit, to the second base station, a power headroom report (PHR) including the second type PH for the primary cell associated with the first base station.

7. The UE of claim 6, wherein the configuration information is included in a radio resource control (RRC) reconfiguration information for the second base station.

8. The UE of claim 6, wherein the PHR is triggered based on a set criterion.

9. The UE of claim 6, wherein the first base station operates according to a first radio access technology (RAT) and the second base station operates according to a second RAT.

10. The UE of claim 9, wherein the first RAT includes long term evolution (LTE) and the second RAT includes new radio (NR).

11. A method for receiving a power headroom report (PHR) from a user equipment (UE) operating with a first base station and a second base station, performed by the second base station in a wireless communication system, comprising:

generating configuration information for configuring a secondary cell group (SCG) associated with the second base station;

transmitting the configuration information including an indication indicating to report, to the second base station, a second type power headroom (PH) for a primary cell associated with the first base station; and receiving, from the UE, the PHR including the second type PH for the primary cell associated with the first base station.

12. The method of claim 11, wherein the configuration information is included in a radio resource control (RRC) reconfiguration information for the second base station.

13. The method of claim 11, wherein the first base station operates according to a first radio access technology (RAT) and the second base station operates according to a second RAT.

14. The method of claim 13, wherein the first RAT includes long term evolution (LTE) and the second RAT includes new radio (NR).

15. The method of claim 11, wherein the PHR is triggered based on a set criterion.

16. A second base station for receiving a power headroom report (PHR) from a user equipment (UE) operating with a first base station and the second base station in a wireless communication system, comprising:

a transceiver; and at least one processor coupled with the transceiver and configured to control to:

generate configuration information for configuring a secondary cell group (SCG) associated with the second base station, transmit the configuration information including an indication indicating to report, to the second base station, a second type power headroom (PH) for a primary cell associated with the first base station, and receive, from the UE, the PHR including the second type PH for the primary cell associated with the first base station.

17. The second base station of claim 16, wherein the configuration information is included in a radio resource control (RRC) reconfiguration information for the second base station.

18. The second base station of claim 16, wherein the first base station operates according to a first radio access technology (RAT) and the second base station operates according to a second RAT.

19. The second base station of claim 18, wherein the first RAT includes long term evolution (LTE) and the second RAT includes new radio (NR).

20. The second base station of claim 16, wherein the PHR is triggered based on a set criterion.

\* \* \* \* \*